(12) United States Patent
Beveridge et al.

(10) Patent No.: US 10,976,981 B2
(45) Date of Patent: *Apr. 13, 2021

(54) REMOTE DESKTOP EXPORTING

(71) Applicant: VMware, Inc., Palo Alto, CA (US)

(72) Inventors: Daniel James Beveridge, Apollo Beach, FL (US); Blake Watts, St. George, UT (US); Jian Mu, Beijing (CN)

(73) Assignee: VMware, Inc., Palo Alto, CA (US)

( * ) Notice: Subject to any disclaimer, the term of this patent is extended or adjusted under 35 U.S.C. 154(b) by 324 days.

This patent is subject to a terminal disclaimer.

(21) Appl. No.: 15/250,443

(22) Filed: Aug. 29, 2016

(65) Prior Publication Data

US 2016/0364200 A1 Dec. 15, 2016

Related U.S. Application Data

(63) Continuation-in-part of application No. 14/686,769, filed on Apr. 14, 2015, now Pat. No. 10,827,004, (Continued)

(51) Int. Cl.
*G06F 3/14* (2006.01)
*G06F 3/0484* (2013.01)
(Continued)

(52) U.S. Cl.
CPC ........ *G06F 3/1454* (2013.01); *G06F 3/04842* (2013.01); *G06F 3/1423* (2013.01); *G06F 9/452* (2018.02); *G09G 5/005* (2013.01); *H04L 12/4633* (2013.01); *H04L 67/08* (2013.01); *H04L 67/28* (2013.01); *H04L 67/36* (2013.01)

(58) Field of Classification Search
CPC .. G06F 3/1454; G06F 3/04842; G06F 3/1423; H04L 67/42; H04L 12/4633; F04L 67/28
See application file for complete search history.

(56) References Cited

U.S. PATENT DOCUMENTS 4,467,421 A 8/1984 White
6,639,687 B1 * 10/2003 Neilsen ............... G06F 11/0715
358/1.1

(Continued)

FOREIGN PATENT DOCUMENTS

JP 08-212187 8/1996
JP 2006-081159 3/2006
(Continued)

OTHER PUBLICATIONS

European Patent Office, International Search Report and Written Opinion for PCT/US2010/046377, dated Jan. 30, 2013, 11 pages.
(Continued)

*Primary Examiner* — Daeho D Song

(57) ABSTRACT

A selected screen, such as a monitoring tool, operating on a remote desktop is exported to a mobile client device, such as a smart phone, tablet, smart watch, etc. The client device polls the remote desktop for images, pointers, commands, etc. relating to the selected screen. The remote desktop provides the requested data to the client device through a command queue maintained by the remote desktop.

20 Claims, 12 Drawing Sheets

Related U.S. Application Data which is a continuation of application No. 13/217,484, filed on Aug. 25, 2011, now Pat. No. 9,009,219.

(60) Provisional application No. 62/211,736, filed on Aug. 29, 2015, provisional application No. 62/211,850, filed on Aug. 30, 2015, provisional application No. 62/356,507, filed on Jun. 29, 2016, provisional application No. 62/356,506, filed on Jun. 29, 2016, provisional application No. 61/508,404, filed on Jul. 15, 2011.

(51) Int. Cl.
*H04L 12/46* (2006.01)
*H04L 29/06* (2006.01)
*H04L 29/08* (2006.01)
*G09G 5/00* (2006.01)
*G06F 9/451* (2018.01)

(56) References Cited

U.S. PATENT DOCUMENTS

| | | | |
|---|---|---|---|
| 6,873,934 B1 * | 3/2005 | Rodrigues | G06F 11/3419 702/186 |
| 7,110,995 B2 * | 9/2006 | Kirkland | G06F 16/1734 |
| 7,117,243 B2 | 10/2006 | Peart | |
| 7,181,578 B1 | 2/2007 | Guha et al. | |
| 7,184,764 B2 | 2/2007 | Raviv et al. | |
| 7,325,040 B2 * | 1/2008 | Truong | G06F 9/5072 709/217 |
| 7,542,774 B1 * | 6/2009 | Svoboda | H04M 1/2757 455/500 |
| 7,606,868 B1 | 10/2009 | Le et al. | |
| 7,669,020 B1 | 2/2010 | Shah et al. | |
| 7,747,749 B1 * | 6/2010 | Erikson | G06F 16/9574 709/226 |
| 7,941,470 B2 | 5/2011 | Le et al. | |
| 8,027,354 B1 | 9/2011 | Portolani | |
| 8,112,748 B2 | 2/2012 | Pomerantz | |
| 8,234,236 B2 | 7/2012 | Beaty | |
| 8,261,268 B1 | 9/2012 | Forgette | |
| 8,266,311 B2 | 9/2012 | Virdi et al. | |
| 8,271,528 B1 | 9/2012 | Wilkinson et al. | |
| 8,356,084 B2 | 1/2013 | Yamamoto | |
| 8,433,802 B2 | 4/2013 | Head et al. | |
| 8,516,378 B2 * | 8/2013 | Kikkawa | H04N 21/43615 715/744 |
| 8,549,413 B2 * | 10/2013 | Balasubramanian | G06Q 10/10 715/751 |
| 8,555,274 B1 | 10/2013 | Chawla et al. | |
| 8,606,029 B1 * | 12/2013 | Wong | H04N 19/17 382/239 |
| 8,644,620 B1 * | 2/2014 | Lam | G06F 13/10 382/209 |
| 8,706,271 B2 * | 4/2014 | Covaro | H05B 47/11 700/90 |
| 8,836,653 B1 * | 9/2014 | Faller | G06F 3/14 345/173 |
| 9,009,219 B2 | 4/2015 | Chawla et al. | |
| 9,043,455 B1 * | 5/2015 | Kashanian | H04W 8/245 709/224 |
| 9,075,560 B2 * | 7/2015 | Sankuratri | H04N 19/42 |
| 9,152,373 B2 * | 10/2015 | King | H04L 67/38 |
| 9,292,248 B2 * | 3/2016 | Das | H04L 67/141 |
| 10,164,788 B2 * | 12/2018 | Park | H04L 12/282 |
| 10,303,357 B2 * | 5/2019 | Hayes | H04L 67/04 |
| 2002/0022985 A1 * | 2/2002 | Guidice | G06Q 10/0875 700/28 |
| 2002/0067283 A1 * | 6/2002 | Marmaropoulos | H04N 21/485 340/815.69 |
| 2002/0091697 A1 * | 7/2002 | Huang | G06F 16/9535 |
| 2002/0184499 A1 * | 12/2002 | Taguchi | G06F 8/61 713/168 |
| 2003/0084124 A1 * | 5/2003 | Su | H04L 29/06 709/219 |
| 2003/0195950 A1 | 10/2003 | Huang et al. | |
| 2003/0234790 A1 * | 12/2003 | Hochmuth | G06F 3/14 345/545 |
| 2004/0075701 A1 * | 4/2004 | Ng | H04M 1/72552 715/867 |
| 2005/0066121 A1 * | 3/2005 | Keeler | G06F 12/128 711/113 |
| 2005/0091179 A1 * | 4/2005 | Kalthoff | G06F 21/62 |
| 2005/0102631 A1 * | 5/2005 | Andreas | G06F 9/451 715/772 |
| 2005/0228947 A1 * | 10/2005 | Morita | G06F 11/2025 711/114 |
| 2006/0002315 A1 * | 1/2006 | Theurer | G06F 3/1454 370/261 |
| 2006/0031781 A1 * | 2/2006 | Keohane | G06F 9/451 715/807 |
| 2006/0080397 A1 | 4/2006 | Chene et al. | |
| 2006/0101225 A1 * | 5/2006 | Aloni | H04L 67/1097 711/202 |
| 2006/0200066 A1 * | 9/2006 | Fischer | G06F 21/84 604/20 |
| 2006/0288306 A1 * | 12/2006 | Mahajan | G06F 9/452 715/804 |
| 2007/0174410 A1 | 7/2007 | Croft et al. | |
| 2007/0186212 A1 | 8/2007 | Mazzaferri et al. | |
| 2007/0192329 A1 | 8/2007 | Croft et al. | |
| 2007/0192723 A1 * | 8/2007 | Anzelde | G06F 9/451 715/772 |
| 2007/0198656 A1 | 8/2007 | Mazzaferri et al. | |
| 2007/0204011 A1 | 8/2007 | Shaver et al. | |
| 2007/0226636 A1 * | 9/2007 | Carpenter | G06F 3/0412 715/751 |
| 2007/0260702 A1 | 11/2007 | Richardson et al. | |
| 2007/0264976 A1 * | 11/2007 | Lessing | H04W 88/06 455/414.1 |
| 2007/0300063 A1 * | 12/2007 | Adams | G06F 21/35 713/168 |
| 2008/0034071 A1 | 2/2008 | Wilkinson et al. | |
| 2008/0235177 A1 * | 9/2008 | Kim | G06Q 40/00 |
| 2008/0243998 A1 * | 10/2008 | Oh | G06F 3/0482 709/203 |
| 2008/0250424 A1 | 10/2008 | Brugiolo et al. | |
| 2008/0256471 A1 * | 10/2008 | Okamoto | G06F 3/0486 715/769 |
| 2008/0281798 A1 | 11/2008 | Chatterjee et al. | |
| 2008/0313355 A1 * | 12/2008 | Prasad | G06F 16/27 709/248 |
| 2008/0320583 A1 | 12/2008 | Sharma et al. | |
| 2009/0006537 A1 | 1/2009 | Palekar et al. | |
| 2009/0070405 A1 * | 3/2009 | Mazzaferri | G06F 3/0484 709/202 |
| 2009/0094523 A1 | 4/2009 | Treder et al. | |
| 2009/0201423 A1 * | 8/2009 | Sugiyama | H04N 5/765 348/564 |
| 2009/0216975 A1 | 8/2009 | Halperin et al. | |
| 2009/0222739 A1 * | 9/2009 | Schmieder | G06F 9/451 715/740 |
| 2009/0235358 A1 | 9/2009 | Tolba | |
| 2009/0240904 A1 | 9/2009 | Austruy et al. | |
| 2009/0244015 A1 * | 10/2009 | Sengupta | H04W 4/21 345/173 |
| 2009/0248802 A1 * | 10/2009 | Mahajan | H04L 65/4015 709/204 |
| 2009/0265487 A1 * | 10/2009 | Zhang | G06Q 10/10 710/61 |
| 2010/0048358 A1 * | 2/2010 | Tchao | A63B 71/0616 482/9 |
| 2010/0056130 A1 * | 3/2010 | Louch | H04M 11/007 455/420 |
| 2010/0070870 A1 | 3/2010 | Halperin et al. | |
| 2010/0070978 A1 | 3/2010 | Chawla et al. | |
| 2010/0114867 A1 | 5/2010 | Olston | |
| 2010/0131654 A1 | 5/2010 | Malakapalli et al. | |
| 2010/0131949 A1 | 5/2010 | Ferris | |

(56) References Cited

U.S. PATENT DOCUMENTS

| | | | |
|---|---|---|---|
| 2010/0153878 A1* | 6/2010 | Lindgren | G06F 3/0481 715/810 |
| 2010/0191783 A1 | 7/2010 | Mason | |
| 2010/0199276 A1 | 8/2010 | Umbehocker | |
| 2010/0211944 A1 | 8/2010 | Kaneda | |
| 2010/0261507 A1* | 10/2010 | Chang | H04L 67/10 455/566 |
| 2010/0268813 A1* | 10/2010 | Pahlavan | G06F 9/452 709/224 |
| 2010/0269152 A1* | 10/2010 | Pahlavan | H04L 63/0884 726/3 |
| 2010/0274784 A1 | 10/2010 | Acharya | |
| 2010/0313239 A1* | 12/2010 | Chakra | G06F 21/6218 726/2 |
| 2011/0004680 A1 | 1/2011 | Ryman | |
| 2011/0066668 A1 | 3/2011 | Guarraci | |
| 2011/0099297 A1 | 4/2011 | Hayton | |
| 2011/0099497 A1* | 4/2011 | Fok | H04L 67/06 715/769 |
| 2011/0113165 A1* | 5/2011 | Ryu | G06F 13/387 710/30 |
| 2011/0119668 A1 | 5/2011 | Calder et al. | |
| 2011/0125679 A1* | 5/2011 | Brdiczka | G06Q 10/06 706/12 |
| 2011/0126231 A1* | 5/2011 | Ko | H04N 21/47214 725/39 |
| 2011/0131330 A1* | 6/2011 | Beaty | G06F 9/452 709/227 |
| 2011/0141123 A1* | 6/2011 | Kumar | G06F 9/452 345/520 |
| 2011/0153716 A1 | 6/2011 | Malakapalli et al. | |
| 2011/0167067 A1* | 7/2011 | Muppirala | G06F 3/067 707/740 |
| 2011/0167494 A1* | 7/2011 | Bowen | H04L 63/1491 726/24 |
| 2011/0184993 A1 | 7/2011 | Chawla | |
| 2011/0185292 A1 | 7/2011 | Chawla et al. | |
| 2011/0185355 A1 | 7/2011 | Chawla et al. | |
| 2011/0197151 A1* | 8/2011 | Abdo | G06F 9/542 715/764 |
| 2011/0202151 A1* | 8/2011 | Covaro | H05B 47/11 700/90 |
| 2011/0209064 A1 | 8/2011 | Jorgensen et al. | |
| 2011/0246677 A1* | 10/2011 | Johnson | G06F 3/0689 710/10 |
| 2011/0302495 A1* | 12/2011 | Pinto | G06F 3/04883 715/733 |
| 2011/0320963 A1* | 12/2011 | Wong | H04N 21/631 715/755 |
| 2012/0042275 A1* | 2/2012 | Neerudu | G09G 5/14 715/781 |
| 2012/0048122 A1* | 3/2012 | Dadlani Mahtani | G05B 19/042 99/357 |
| 2012/0060089 A1* | 3/2012 | Heo | G06F 3/1431 715/702 |
| 2012/0066612 A1* | 3/2012 | Virmani | G06F 3/0481 715/748 |
| 2012/0106658 A1* | 5/2012 | Muth | H04W 88/06 375/259 |
| 2012/0162536 A1* | 6/2012 | Sibilsky | H04N 21/41265 348/734 |
| 2012/0304103 A1* | 11/2012 | LeVee | G06F 9/451 715/779 |
| 2013/0018939 A1 | 1/2013 | Chawla et al. | |
| 2014/0032635 A1* | 1/2014 | Pimmel | H04M 1/7253 709/203 |

FOREIGN PATENT DOCUMENTS

| | | |
|---|---|---|
| JP | 2008-511931 | 4/2008 |
| JP | 2009-230253 | 10/2009 |

OTHER PUBLICATIONS

QuickOffice, Inc., QuickOffice Pro for iPhone and iPod Touch, Version. 4.0.0, User Help Guide, Jan. 1, 2010, 42 pages.

Tedd Fox, Citrix Received >> XenApp—Citrix Community, http://community.citrix.com/display/xa/Citrix+Receiver, Aug. 13, 2010, 6 pages.

John McBride et al., Project GoldenGate >> XenApp—Citrix Community, http://community.citrix.com/display/xa/Project+GoldenGate, Jul. 1, 2011, 2 pages.

Office Action received in copending Australian Patent Application No. 2012284345, dated Feb. 18, 2015. 3 pages.

Japanese Office Action received in Japanese Patent Application No. 2014-520299, dated Dec. 1, 2015. 6 Pages.

* cited by examiner

REMOTE DESKTOP EXPORTING

CLAIM OF PRIORITY

This application claims the benefit of U.S. Provisional Patent Application Ser. No. 62/211,736, entitled "Mobile Devices in Service of Desktop Uses" filed on Aug. 29, 2015, and U.S. Provisional Patent Application Ser. No. 62/211,850, entitled "Mobile Devices in Service of Desktop Uses" filed on Aug. 30, 2015, U.S. Provisional Patent Application Ser. No. 62/356,507, entitled "Remote Desktop Mirroring" filed on Jun. 29, 2016, and U.S. Provisional Patent Application Ser. No. 62/356,506, entitled "Remote Desktop Exporting" filed on Jun. 29, 2016. This application is also a continuation-in-part to U.S. patent application Ser. No. 14/686,769 entitled "Native Viewer Use for Service Results from a Remote Desktop" filed on Apr. 14, 2015, which is a continuation of U.S. patent application Ser. No. 13/217,484 entitled "Native Viewer Use for Service Results from a Remote Desktop" filed on Aug. 25, 2011, which claims the benefit of U.S. Provisional Patent Application No. 61/508,404 entitled "Native Viewer Use for Service Results from a Remote Desktop" filed on Jul. 15, 2011. All of these applications are incorporated herein by reference in their entireties for all intents and purposes.

BACKGROUND

The proliferation of mobile computing devices has, in many ways, extended the user experience from desktop and laptop computers (collectively referred to herein as desktops or desktop computers) to more easily transportable devices, such as smart phones, computer tablets, smart watches or glasses, and other mobile devices (collectively referred to herein as mobile devices). But while mobile devices provide flexibility, they often cannot compete with the robust computing power, software, or ease of use available on a desktop or laptop computer. As an example, word processing is often easier for users at a desktop or laptop than on a tablet. Additionally, users often begin tasks on desktop or laptop computers which are time-consuming, and require frequent monitoring. For instance, installation of a new application may require a user to respond to or acknowledge indications from the installation tool. The user-interaction required by these processes or applications is often intermittent or irregular, making it difficult for a user to judge whether constant monitoring is necessary. Unwary users are frustrated when they initiate a task on a laptop or desktop computer and leave the task anticipating it will complete in their absence, only to return and find that the task was interrupted by a request for user input which was never received.

Some existing solutions require that users simply remain in front of their laptop or desktop to monitor whatever process is occurring. For example, a user who is waiting for a software build to complete or a large program to compile, often must sit idly at their desktop computer waiting for the process to complete while, at the same time, the user may need to jump back into working on the build or program upon processing completion. Thus, in many circumstances, it is important for a user to wait for a computer to finish processing of a particular task and be made aware of the task's completion. A conventional operating system (OS) provides status bars for various processing tasks being performed, but they also tether users to the computers presenting the status bars, wasting the user's valuable time.

SUMMARY

One or more embodiments described herein include a system and method to enable establishing a selective screen export (SSE) session between a remote desktop and a client device. The SSE session allows the client device to remotely access a portion of a screen of a remote desktop, such as a monitoring tool, and mirror it onto the client device. The client device polls the remote desktop for queued mirror commands related to the one or more monitoring tools operating on the remote desktop. The client device further retrieves images of the one or more monitoring tools currently opened on the remote desktop and uses the images to mirror, on the client device, the monitoring tools opened on the remote desktop.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
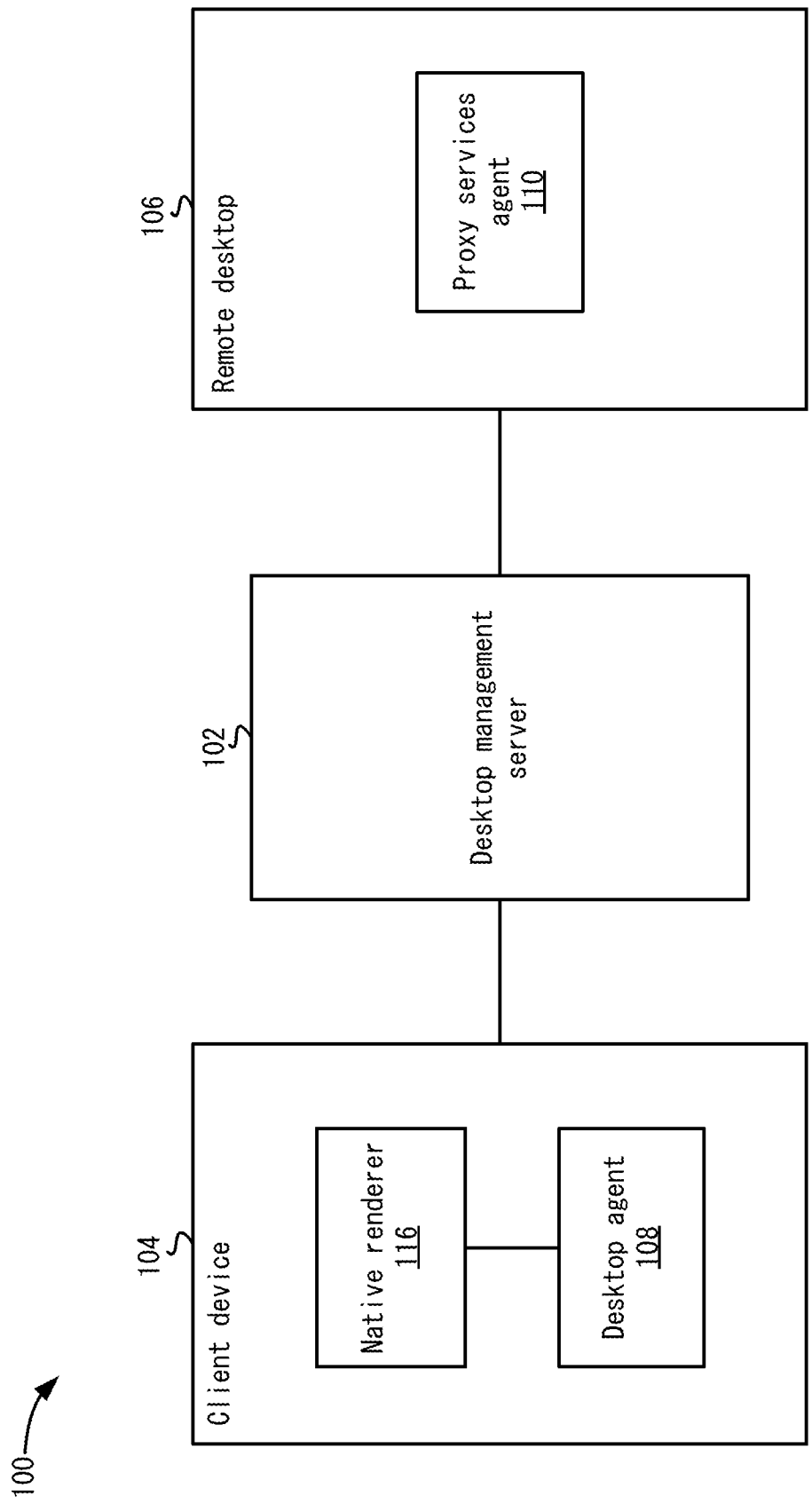
FIG. 1 illustrates a system for providing desktop services.

The embodiments and examples disclosed herein give users the ability to select targeted portions of their desktop screens and mirror those selected portions on mobile devices. More specifically, in some embodiments, a concept referred to herein as a selective screen export (SSE) mirroring of selected UI windows, or portions of the UI windows, on the desktop is referenced herein. SSE mirroring refers to the mirroring of actively running and open software application windows of a desktop onto client devices. Embodiments mirror the selected window to the mobile device, allowing the user to easily monitor the window on the go. The mirrored portion of the desktop may be displayed in a read-only mode that allows users to select an application window for viewing on one or more devices even after the desktop screen locks. Alternatively, some embodiments allow the user to interact with mirrored desktop portions on the mobile device.

Any UI window or portion of a UI window may be selectively mirrored by the user to another device in some examples, allowing the user to remotely monitor operations of the desktop. For example, the SSE embodiments discussed herein allow a user to monitor longer running download or compile jobs on the user's mobile device, giving developers the ability to observe a progress bar (or other type of progress indicator) for the job's download or compile time directly from the mobile device, without having to be tethered to the desktop. In another example, a user may easily monitor the status of a video rendering task being processed on a desktop computer on the user's smart watch. In another example, stock traders, may view Level II stock quotes on their smart phone, even though such quotes are only available on the user's desktop. In another example, a worker on an online presentation who needs to step into another room but wants to follow the presentation on their mobile phone without having to re-login to the online presentation may mirror just the online presentation window opened in the desktop to the mobile phone.

In particular, to implementations that use smart watches or other wearable devices that are paired to the mobile phones, tablets, or other client devices, SSE mirroring may be performed from the desktop computer to the client device and then to the paired smart watch/wearable. In this scenario, images of the selected UI to export may be communicated to the client device and then passed through to the paired watch/wearable. Alternatively, some embodiments use the paired mobile device (e.g., smart phone or tablet) to capture the selectively mirrored desktop screen in the manner discussed below and then transmit the captured desktop screen from the mobile device to the smart watch for display. The smart watch may then display the mirrored screen of the desktop. In such embodiments, the mobile device (e.g., an APPLE IPHONE®-branded smartphone) works with a smart watch (e.g., an APPLE WATCH®-branded smart watch) and relays images of the selected screen on the desktop for exporting to the smart watch for display thereon. For example, if a user wants to view the compile progress bar on smart watch, one example incorporates the user's paired smart phone (e.g., an APPLE IPHONE®-branded smartphone) to retrieve the sequential images of the compile progress bar and communicate those images to the smart watch (e.g., an APPLE WATCH®-branded smart watch) for display thereon. Alternatively, the smart watch itself may act as the mobile device and retrieve the selected screen from the desktop directly, without using a paired mobile device as an intermediary. Both implementations are fully contemplated by the various embodiments discussed herein.

For purposes of this disclosure, the term "result set" indicates data and images about a UI screen or portion of a UI screen that is being exported from a remote desktop to a client device. For example, images of a progress bar for a compile or build window may be included in a result set.

Operating Architecture and Devices

Having described various embodiments of this disclosure, attention is directed to the architecture and individual devices configured to perform the mirroring SSE capabilities previously discussed. Looking at the accompanying figures, FIG. 1 depicts an exemplary system 100 for providing mirroring SSE capabilities. Users operate a mobile device, which is shown and referred to as client device 104, to interact with a desktop management server 102 to access services provided by a user's remote desktop 106. Client device 104, in some examples, uses a client services interface to have services performed by remote desktop 106. The client services interface is part of a remote desktop solution allowing access to remote desktop 106, in some embodiments.

Client device 104 represents a mobile computing device, such as, for example but without limitation, a mobile phone, a mobile tablet, a virtual reality (VR) headset, an electronic watch, a wearable device (e.g., electronic watch, fitness tracker, etc.), vehicle computer (e.g., car dashboard, headrest computer, etc.), or other computing device that has a different form factor than remote desktop 106. Remote desktop 106 may take the form of a personal computer, laptop computer, electronic kiosk, testing station, gaming console, or virtualized computer system. Physical desktops include actual physical machines being controlled remotely. In some embodiments, remote desktop 106 virtualizes a screen size that is different from the size of the display provided by client device 104. Additionally, client device 104 may run a different operating system (OS) with different application characteristics and application programming interfaces (APIs) than remote desktop 106, in some embodiments.

Desktop management server 102 is, in some embodiments, an interface layer that includes desktop management software with various functions. Desktop management server 102 includes a connection broker 723 (illustrated in more detail in FIG. 7, and described in the accompanying text), which allows a remote user to select a type of remote desktop (e.g., remote desktop client or client services interface) and initiate a desktop session, or a connection to remote desktop 106 using client device 104.

Client device 104 includes a desktop agent 108 that communicates with desktop management server 102 or directly to remote desktop 106, which may be hosted remotely or locally by a Type 2 hypervisor running on client device 104. Desktop agent 108, in some examples, sends service requests to have services performed by the user's remote desktop 106. In an embodiment, a side channel for a remote desktop session is used to send the requests and receive the result sets. This side channel is used to send an image of remote desktop 106 using a display protocol, in some examples. Desktop management server 102 allows non-display traffic to be sent from desktop agent 108 to remote desktop 106 in the side channel. This process is described in more detail below.

The service queries include file explorer services, web proxy services, and search services, all of which will be described in more detail below. Other services may also be performed. In an embodiment, proxy services agent 110 only processes service requests from client device 104. In that example, other requests, such as remote desktop protocol requests, for the desktop are processed by other agents in desktop management server 102.

In some embodiments, client device 104 sends service requests—directly to the remote desktop 106 or indirectly through the proxy service agent 110—polling for mirror commands that are queued for selected UI screens (or portions of UI screens) from the remote desktop 106. For example, the remote desktop 106 may be configured to mirror a UI of a progress status bar indicator and consequently queue mirror commands and image locations of the progress status bar either internally on the remote desktop 106 or externally through the proxy services agent 110. The client device 104 may then send requests to the remote desktop 106 or the proxy services agent 110, either of which responds with images of the progress status bar—or locations of where the images may be retrieved, e.g., in a virtual desktop infrastructure (VDI)—and display the images of the progress status bar on the client device 104.

Alternatively, the remote desktop 106, upon selection of the UI to be mirrored by the user, may constantly push real-time images of the UI as they appear on the remote desktop 106 to the client device 104, or the proxy services agent 110 and then the client device 104. The client device 104 may then display the real-time images of the selected UI on the client device 104. Other embodiments may operate similarly in a push or push-pull model.

Proxy services agent 110 provides multiple services, one of which is to provide images of the selected UI running on remote desktop 106 to client device 104. In one embodiment, a result set is generated by remote desktop 106 and includes the images of the selected UI, and proxy services agent 110 sends the result set to client device 104. A native viewer (not shown) on client device 104 is invoked and used to display the result set. Thus, instead of using a remote desktop protocol to display an image of the user's remote desktop 106, the native viewer is used to display the result set.

With client devices 104 having a different form factor than a user's desktop, the user leverages certain features, such as touch-screen navigation and smooth scrolling provided by the native application that are available on client device 104, but are not available by remote desktop 106. Additionally, providing real-time views of selected remote desktop 106 UIs running on client devices 104 enables users to remotely monitor computer services and resources while on the go or in a separate location.

In some embodiments, proxy services agent 110 outputs a result set representative of the output on an image of remote desktop 106. For example, the result set includes images of the UI of remote desktop 106 to be displayed on client device 104. Any suitable protocol or API is implemented for message transmission between client device 104 and desktop management server 102.

Various web services protocols are used, and the message payloads are encrypted and/or compressed. Desktop agent 108 uses a native renderer 116 to display the result set. Desktop agent 108 and native render 116 are, in some embodiments, integrated into a single application (or app) that is installed onto the device.

Native renderer 116 selects a native viewer and launches the native viewer to display the result set. The native viewer may be a component of the system software shipped with device 104, an add-on application or plug-in, or integrated with desktop agent 108 and/or native renderer 116. In one embodiment, the native viewer is optimized for the screen size of client device 104 and includes features available to client device 104 that may not be available on remote desktop 106. For example, different views, options, and navigation ability (e.g., zoom-in, pan, and rotate features, touch screen, etc.) are provided for locally viewed result sets. For example, a native file explorer application is used to display a list of files.

Figure 2:
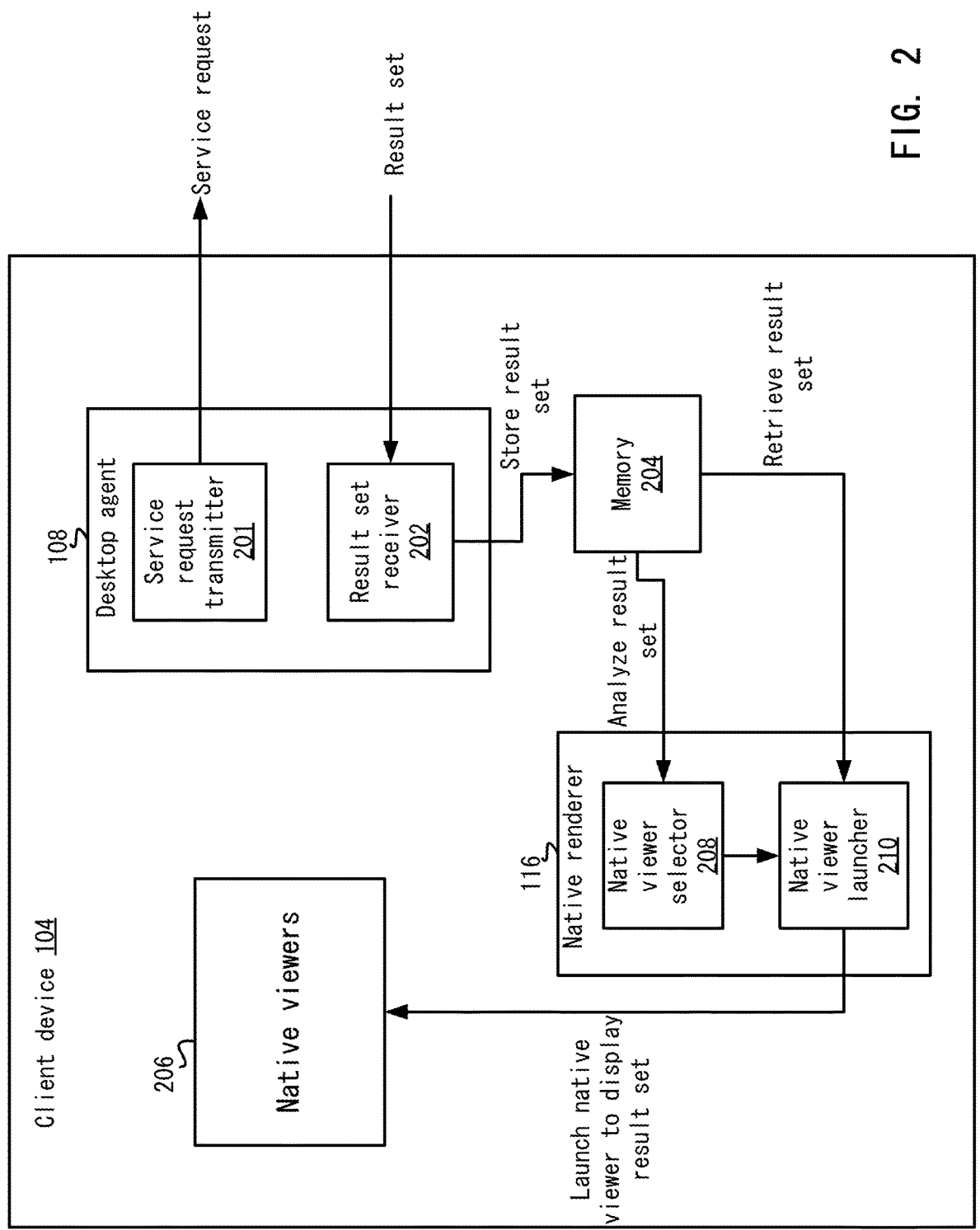
FIG. 2 illustrates a block diagram of a client device.

FIG. 2 depicts a more detailed example of client device 104. Client device 103 includes the desktop agent 108, a native renderer 116, non-transitory computer memory 204, and one or more native viewers 206. More specifically, desktop agent 108 includes a service request transmitter 201 and a result set receiver 202, and native renderer 116 includes a native viewer selector 208 and a native launcher 210. These component are shown and discussed merely to disclose some embodiments; however, other embodiments may include additional or alternative component parts than those shown.

Selective screen exporting from the remote desktop 106 to the client device 104 frequently requires changing the format of the exported screen in order to display it properly on the client device 104. As an example, the dimensions of a monitor of the remote desktop 106 will frequently be significantly larger than those of the client device 104. Similarly, there is often not a one to one change in the dimensions. The monitor of the remote desktop 106 will frequently be wider than it is tall (e.g., the screen of a laptop computer), while the client device 104 is often taller than it is wide (e.g., a cellular telephone oriented in portrait mode). The components described and illustrated in FIG. 2 enable the client device 104 to adapt the exported screen and render it appropriately for the type of client device 104.

Accordingly, particular embodiments use native viewer 206 to display result sets from service requests. Using native viewer 206 leverages the form factor and ergonomics of client device 104. For example, if client device 104 has a small mobile phone form factor, a complete MICROSOFT WINDOWS®-branded desktop folder view may not be intuitive for the user. Additionally, converting touch events to mouse/keyboard events may not work correctly on mobile phones with small screen resolutions. Using native viewer 206 allows those touch events to be used without translation to mouse/keyboard events. Additionally, the features of native viewers 206 may now be leveraged. For example, features such as zoom in, pan, and rotate on locally-rendered native viewers 206 for different file formats may be leveraged.

In one embodiment, a user is authenticated before access to remote desktop 106 is allowed. Once authenticated, service request transmitter 201 is used to send a service request to remote desktop 106. Result set receiver 202 of desktop agent 108 receives a result set from proxy services agent 110. The authentication processing of a service request at remote desktop 106 will be described in more detail below.

In an embodiment, a communication channel is opened for displaying a remote bitmap representation of remote desktop 106. Various remote desktop protocols, such as Remote Desktop Protocol (RDP), Virtual Network Computing (VNC), or PC-over-IP (PCoIP), may be used to access remote desktop 106. Client device 104 receives over the communication channel display information using the display protocol, and displays a bitmap representation of the remote desktop. A side channel for the communication channel may be used to send service queries and receive result sets that operates inside the same network ports as the main display protocol communication but which logically segments 'side channel' data using a system of embedded content tagging. Desktop agent 108 opens ports on client device 104 that are used to connect to desktop management server 102 through the side channel, in some embodiments. Accordingly, client device 104 is not required to communicate through the side channel for receiving the bitmap representation of remote desktop 106. Rather, an independent channel for sending service requests and receiving result sets may be used.

Depending on implementation, service request transmitter 201 and result set receiver 202 send and receive, respectively, communications in any suitable protocol either as an independent network channel or as a side channel to an established display protocol network channel. The protocols may be able to send metadata and result sets in text-based or binary formats. Additionally, the protocol may be used across different OS platforms (e.g., IOS®-, ANDROID®-, WEBOS®-, and BLACKBERRY®-branded OSes). In an embodiment, JAVASCRIPT object notation (JSON) is used. JSON is a text-based format used for sending data over a network connection for web services. Other protocols may also be used. For example, APACHE THRIFT™ is an interface definition language that is used as a remote procedure call (RPC) framework. APACHE THRIFT™ is a binary communication protocol and provides object-level RPC abstractions using a binary wire protocol. GOOGLE®-branded "protobuf" may be used for encoding of structured data in a binary format.

The result set includes images or pointers to images of the UI window being selectively exported, and, once downloaded, the result set may be stored in a memory 204, which may be local cache memory. Memory 204 (or the result set stored therein) is be encrypted and made accessible only after the user has been authenticated, in some examples. Also, memory 204 is protected from other applications on client device 104 when the user is not accessing remote desktop 106. For example, the data stored in memory 204 is not accessible by other applications other than via desktop agent 108. Known techniques for securing (e.g., encrypting) memory 204 are used, additionally. Also, result sets stored in memory 204 are persistent, in some embodiments. For example, when client device 104 is offline, the result sets in memory are still accessible. In an embodiment, memory 204 may be a fixed size. When memory 204 is of a fixed size, an eviction policy is used to clear space in memory 204, in some instances. Different methods to free up space in memory 204 are known in the art, such as a least recently used (LRU) policy. Also, although memory 204 is described as being a fixed size, memory 204 is alternatively expandable via external memory devices.

In one example, when a service request is performed, memory 204 is checked to determine if the result set (e.g., the images of the selectively exported UI) already resides in memory 204. For example, when a file is requested, a "last modified date" time-stamp policy is used to determine if a file has been changed on remote desktop 106 before downloading the file again. If the file has not been changed, then the file is retrieved from memory 204 and displayed.

After the result set is downloaded to memory 204, a native viewer 206 renders the selected UI being exported. Native viewers 206 are local to client device 104. That is, the applications, components, plugins, etc., comprising native viewers 206 are stored on client device 104 and are launched on client device 104. Typically, native viewers 206 are customized for the form factor of client device 104. In this case, native viewer 206 has different features that leverage the form factor. For example, native viewers 206 leverages touch screens and various touch commands. Also, native viewer 206 has features that are not available on applications running on remote desktop 106, in some embodiments. Additionally, the data may be displayed in a way that fits the form factor in client device 104. For example, some mobile devices have smaller screens and the data is formatted in a way to optimize the viewing of the data on those smaller screens.

In some embodiments, a local native viewer 206 is not available to render the SSE UI window in the result set. In this case, a third-party application may be used. The third-party application may include a cloud-based application where the application is installed and maintained on a server (e.g., a server in a data center that also includes remote desktop 106) that is accessible to client 104. In one example, native viewer launcher 210 opens an interface for the third-party application using a representational state transfer (REST) interface. Native viewer launcher 210 may connect to the server, such as an application publication server (e.g., such as a terminal server or similar technology), to download the result set and be provided with the user interface for edit/view functionality over a desktop remoting protocol. In this case, remote desktop 106 may send the result set to the server instead of client device 104. Also, using the third party application may be efficient when the file size is large and the user is only interested in a portion of the file. In an embodiment, when the server and virtual machine running remote desktop 106 are in the same data center, sending the result set to the server may be faster due to the bandwidth being higher in the data center than sending the result set to client device 104.

Figure 3:
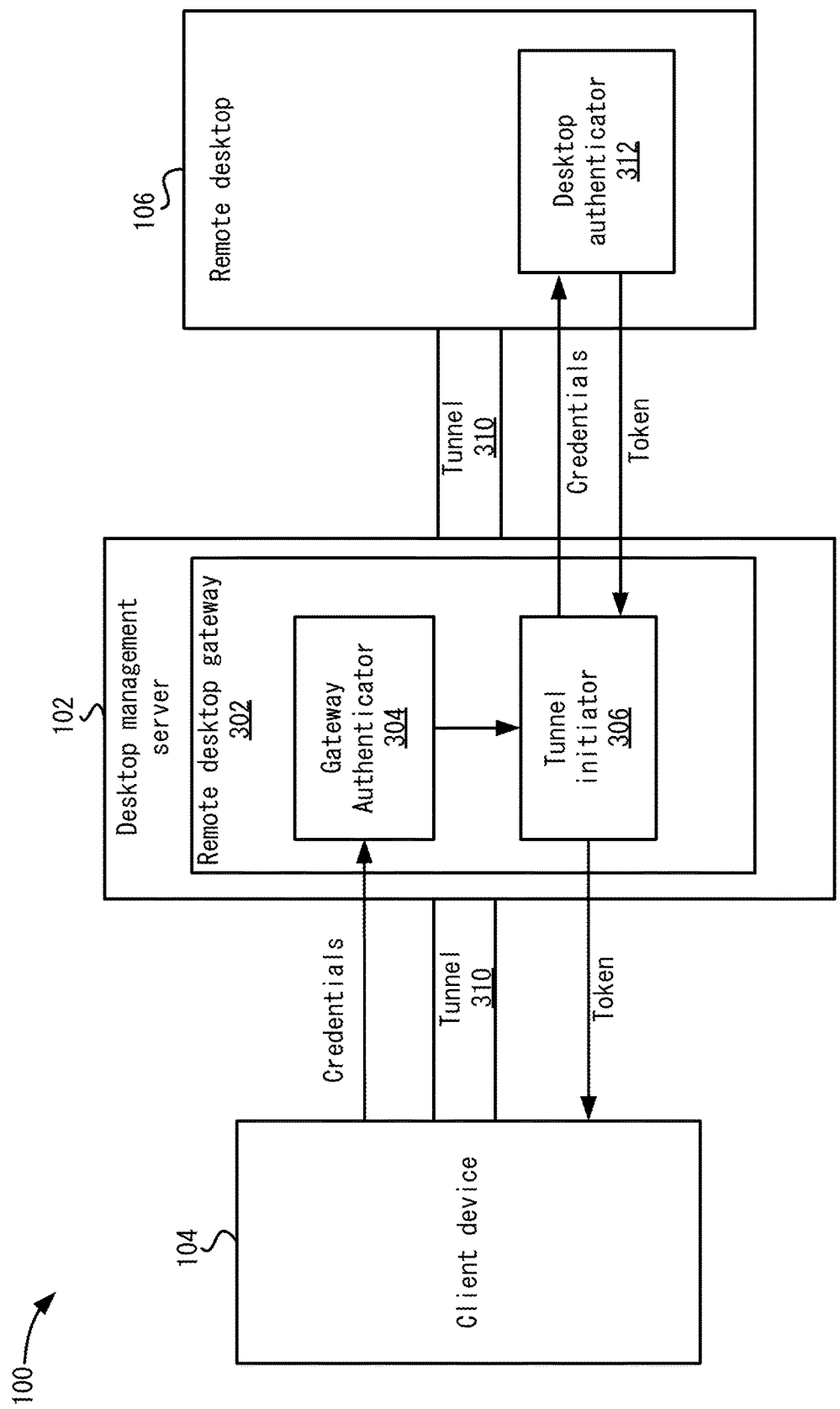
FIG. 3 illustrates a block diagram of an operating environment for authenticating a user.

The user may be authenticated before accessing remote desktop 106. FIG. 3 shows a more detailed example of system 100 for authenticating the user. A remote desktop gateway 302 is used to authenticate the user. Remote desktop gateway 302 may be deployed in a demilitarized zone (DMZ) in the data center and may be included in a connection broker 723 in FIG. 7, which is described below. In one example, a new client services interface (shown in FIG. 6) is launched by a user to have services performed. The client services interface may be similar to a remote desktop client in terms of establishing connectivity to remote desktop 106. The illustrated configuration in FIG. 3, which is described in more detail above, is but one example configuration, and is not meant to limit all embodiments to any particular combination of devices and components.

Although the authentication is described with respect to establishing a remote desktop session, an independent authentication process may be used for establishing a session for having services performed. When the client services interface on client device 104 is launched, client device 104 provides credentials to remote desktop gateway 302. For example, enterprise credentials are provided to authenticate the access for the user to remote desktop 106. A gateway authenticator 304 authenticates the credentials. Gateway authenticator 304 may use different methods of authenticating the credentials. In one example, based on the administrative policy, the user may be asked to use a two-factor authentication. For example, the user may be required to first provide a token (e.g., RSA SECURID®-branded token) and then provides active directory credentials. This example of an authentication process is known and need not be described further.

In an embodiment, in some cases where users are outside an enterprise network, once the user is authenticated, a tunnel initiator 306 determines a remote desktop 106 for the user. For example, a connection is initiated to a virtual machine running in the data center. The credentials are passed to the virtual machine. The virtual machine accessed could be the user's assigned virtual machine, or a generic virtual machine used just for mounting and accessing the user's virtual disk. This way, the user's virtual machine need not be running to access the user's data.

A desktop authenticator 312 is used to authenticate the user and returns a token that can be used by client device 104 for communication with remote desktop 106. Tunnel initiator 306 then initiates a tunnel 310 between client device 104, gateway 302, and remote desktop 106. Tunnel 310 allows users from outside a firewall of the enterprise to access resources hosted in the enterprise (e.g., remote desktop 106). It may not be necessary to establish a tunnel for users inside the enterprise network.

In an embodiment, a remote desktop session is also initiated to allow an image of the user's desktop to be displayed. Display protocol information, such as PCoIP/

RDP protocol display information, may be sent through tunnel 310. For example, Hypertext Transfer Protocol Secure (HTTPS) is used and the display information is encrypted using secure socket layer (SSL). Additionally, as discussed above, a side channel to the remote desktop session is used to send service requests and result sets through the tunnel. In an embodiment, client device 104 uses separate ports to have services performed than those used to send the display information.

Once client device 104 is authenticated, client device 104 can send service requests through tunnel 310. If the user on the same network as remote desktop 106, then communication may flow directly from client device 104 to remote desktop 106 without mediation through remote desktop gateway 302. In one example, client 104 may be provided an initial client services interface that provides various options to interact with remote desktop 106. For example, different services may be performed, such as the file explorer service, the search service, or the browser service. Client device 104 can generate and send a service request with the token through tunnel 310. Proxy services agent 110 verifies the token and can service the request.

Figure 4:
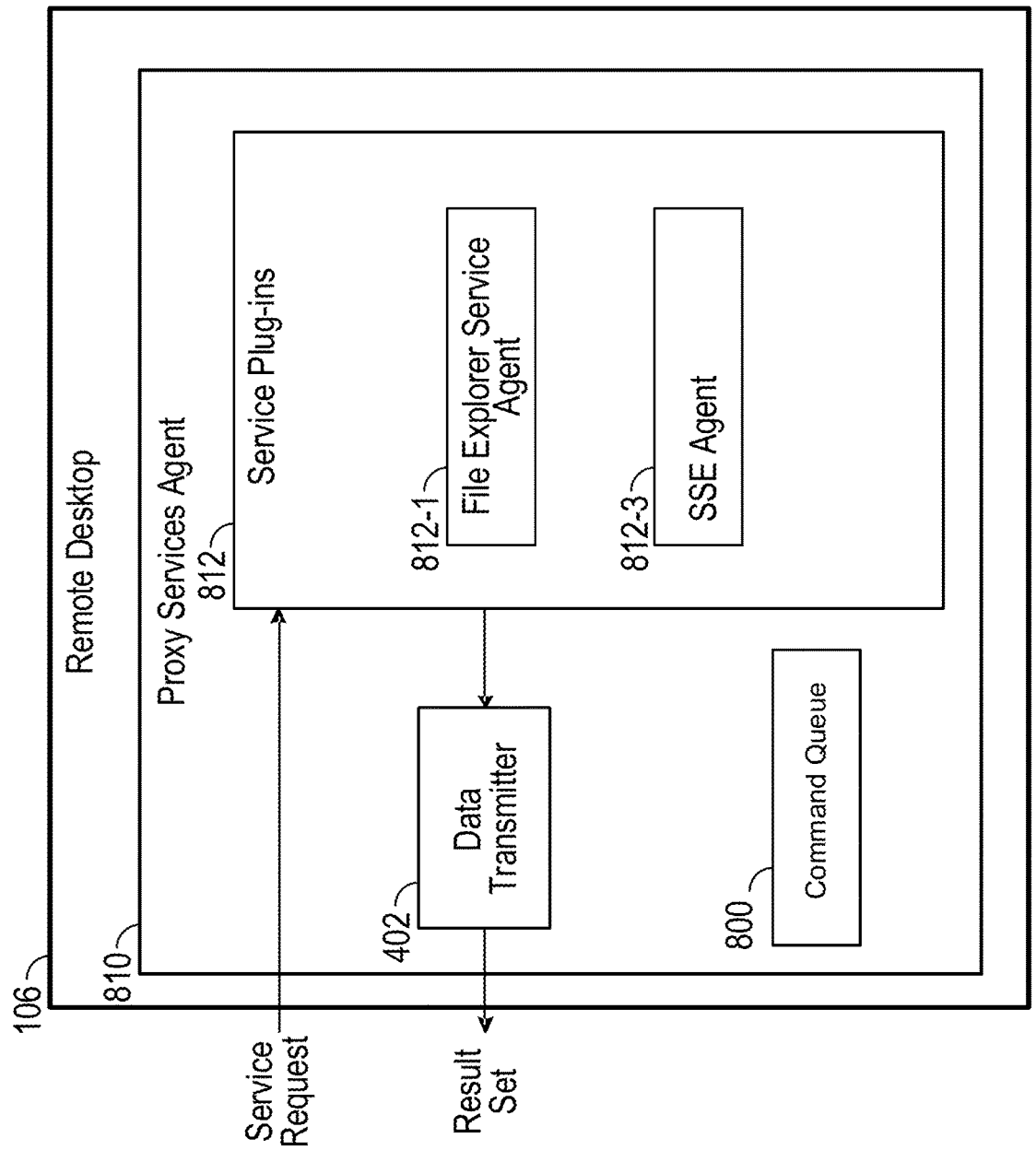
FIG. 4 illustrates a block diagram of a proxy services agent operating on a remote desktop.

FIG. 4 depicts a detailed example of proxy services agent 110 operating on the remote desktop 106. The proxy services agent 110, in some examples, manages the execution of the operations required to effectuate selective screen exporting. As described herein, a service request may be received from a client device 104. Proxy services agent 810 includes various service plug-ins 812, including a file explorer service agent 812-1 and an SSE agent 812-3. Other possible agents (not illustrated) including a registration agent, an authentication agent, a messaging service agent, and a tunneling agent may be used to process different service requests. The proxy services agent 810 also includes a command queue 800 that stores various instructions for SSE mirroring. Additional or alternative plug-ins may be used in various embodiments. Embodiments discussed below reference the remote desktop 106 selective screen exporting to the client device 104.

In an embodiment, file explorer service agent 112-1 performs requests associated with the files stored on or accessible to remote desktop 106, and specifically retrieves file images or pointers thereto associated with documents, application windows, and software being mirrored between the remote desktop 106 and the client device 104. SSE agent 812-3 detects opened software UI windows designated by the user of the remote desktop 106 for mirroring to the client device 104 and issues mirroring instructions for storage in the command queue 800.

In some examples the registration agent registers the client device 104—e.g., using a MAC address, IP address, or other unique identifier—as a mobile device for mirroring opened software applications of the remote desktop 106. Tunneling service agent provides proxy tunneling service through one or more remote devices of a VDI, such as the VDI discussed with respect to FIG. 7, or in a VDI that uses containers or unikernels.

Proxy services agent 110 receives service requests for providing SSE mirroring of active software windows on the remote desktop 106 that are selected by the user. Proxy services agent 110 performs the requested services, optionally, by performing system calls to the operating system running on remote desktop 106. Also, applications running on remote desktop 106 may also be queried to perform the services. A result set that includes the selected UI being exported is gathered by proxy service agent 110 and then returned to client device 104. The type of result set may depend on the service performed. For example, proxy services agent 110 may use file explorer service agent 812-1 to output a list or locations of files.

In an embodiment, proxy services agent 110 includes a command queue 800 for storing commands for SSE mirroring. Command queue 800 may store any kind of data. In addition to the other commands and instructions mentioned herein, command queue 800 store instructions related for application window delivery. For SSE mirroring, in an embodiment, the opening of an application on the remote desktop causes the SSE agent 812-3 to create and queue a SSE mirroring command in the command queue 800. In an embodiment, the SSE mirroring command includes an instruction to mirror the opened file and one or more pointers to images of the opened file. The desktop agent 108 of the client device 104 may be configured to periodically poll the remote desktop 106 for commands in the command queue 800, and the remote desktop 106 exposes the commands in the command queue 800 in response. Upon receipt of the instruction to SSE an item on the remote desktop 106, the desktop agent 108 of the client device 104 may then request the location of the images of the opened item.

The file explorer service agent 112-1 may either provide the pointer location to the images of the opened file, thereby allowing the desktop agent 108 of the client device 104 to retrieve the images and display the mirrored opened file on the client device 104, or alternatively, the file explorer service agent 112-1 may pull and provide the images to the desktop agent 108 of the client device 104 as a result set transmitted via the data transmitter 402. Images of the mirrored application window may be retrieved, in an embodiment, by either the desktop agent 108 or the file explorer service agent 112-1 using a Web Distributed Authoring and Versioning (WebDAV) protocol. The desktop agent 108 of the client device 104 displays the retrieved images of the mirrored application window and, in an embodiment, continues polling the proxy services agent 110 and retrieving subsequent images of the opened application window to continue the mirroring process.

SSE agent 812-3 operates in the manner to mirror user-selected UI windows on the remote desktop 106 on the client device 104. SSE agent 812-3 receives a user selection of a UI window currently opened on the remote desktop 106. In an embodiment, the user can select a particular window and choose a command to mirror the window. Once the window is selected, the SSE agent 812-3 generates mirroring commands and pointers to locations of images for the selected window to the command queue 800 that are discoverable by the polling client device 104. The desktop agent 108 of the client device 104, in its polling of the command queue 800, discovers the mirroring commands and image locations and continually pulls the images of the selected window for display on client device 104, thereby mirroring the user-selected UI window.

Programs on the remote desktop 106 may be mirrored in either a read-only mode (in some embodiments) or an interactive mode (in other embodiments). In read-only mode, the user of the client device 104 cannot control or interact with the mirrored UI window. In the interactive move, SSE agent 812-3 is bi-directional, meaning it is capable of receiving user interactions in the mirrored UI window from the client device 104 and providing such interactions to the corresponding program of the UI running on the remote desktop 106. The bi-directional SSE agent 812-3 allows for the user to control, from the client device 104, the software on the remote desktop 106 being mirrored. For example, a download progress bar may include a "Cancel" button for canceling the downloading process. Some embodiments allow the user to engage that Cancel button on the client device 104 in the mirrored UI window, and stop the downloading on the remote desktop 106.

In some embodiments, a tunneling service agent (not illustrated) operates to tunnel mirrored application windows or selected UI windows through a virtualized desktop infrastructure (VDI) client that is executing on another device separate from the client device 104 and the remote desktop 106, or as a virtualized instance on the remote desktop 106. The tunneling service agent proxies polling requests and updated application windows generally meant for the remote desktop 106 through a remote instance of the VDI client. The VDI client can then provide all the mirroring commands, application windows or software image locations, and updates to the application windows back to the client device 104, performing the various functions, and therefore the place of, the remote desktop 106, in some embodiments. Such a solution frees the remote desktop 106 to also provide content to the VDI agent that separately be mirrored to the client device 104, or which can be combined with the VDI-agent mirrored application windows/software on the client device 104.

Figure 5:
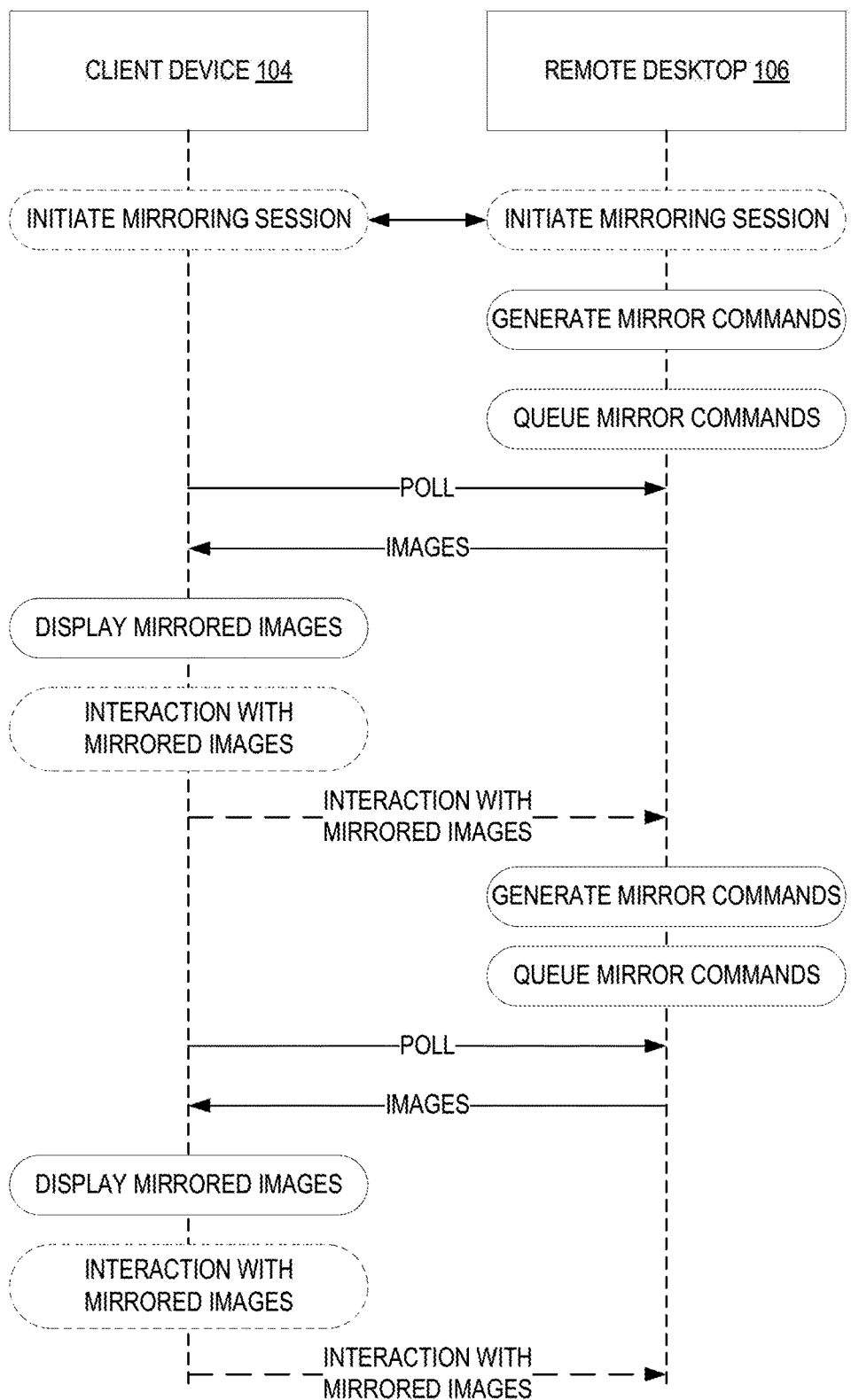
FIG. 5 is a sequence diagram illustrating the interaction between a remote desktop and a client device during selected screen exporting.

FIG. 5 is a sequence diagram illustrating the interaction between the remote desktop and the client device during selected screen exporting. In the example of FIG. 5, the exporting session is initiated at either the remote desktop 106 or the client device 104. The remote desktop 106 generates export commands, and queues them in the command queue 800. The client device 104 polls the remote desktop 106, and retrieves the images and associated pointers for any item, such as a document, a program, a file, an application, etc. to be exported. The client device 104 displays the exported images. In some examples, such as bi-directional exporting, the client device 104 permits some interaction with the exported images. In that example, the interaction with the exported images is exported back to the remote desktop 106 by the client device 104. The process continues, with the remote desktop 106 continuing to generate and queue commands, which are polled, retrieved and displayed by the client device 104, until the exporting session terminates. In some examples, when a request to terminate the session is received, the remote desktop 106 transmits a final image location information of the open program or selected screen with a timestamp before closing the program.

Figure 6:
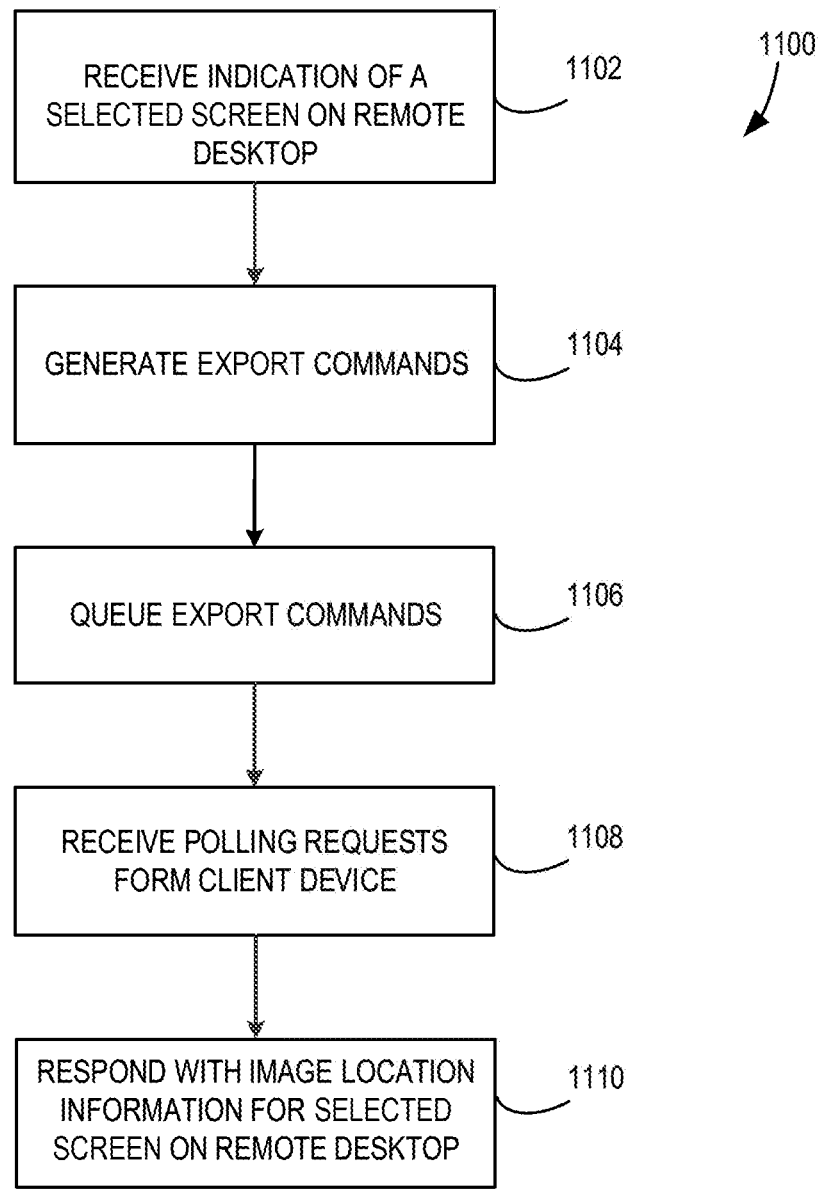
FIG. 6 is a flow chart diagram illustrating a work flow for exporting a selected screen from the perspective of the remote desktop.

FIG. 6 is an example flow chart diagram illustrating a work flow 1100 for exporting a selected screen, such as a monitoring tool, from the perspective of the remote desktop. An indication of a selected screen on a remote desktop 106 to be exported to a client device 104 is received, at shown at block 1102. While in the example of FIG. 6 a selected screen is exported, in some examples a monitoring tool selected from an assortment of screens is exported. In some examples, the indication that the selected screen should be exported is generated at the remote desktop 106; alternatively, the indication is generated at the client device 104 (not illustrated). The indication is generated in a variety of ways. For example, a user requests that the selected screen be exported, a monitoring tool prompts a user to export the status, a client device 104 prompts the user to export a status bar, and the like. In other examples, certain operations, documents, applications, programs, etc. are flagged, tagged, or otherwise identified as "always exported." In that example, opening the flagged or tagged screen will automatically begin exporting. In some examples, monitoring services (e.g. status bars, progress bars, reports, etc.) are exported automatically, without any user interaction. In some examples, each time a workflow of a particular type is begun, an exporting session is established. As an example, every time an application installation is launched, exporting automatically begins to a designated client device 104. In this manner, a user is seamlessly able to monitor installation at a remote desktop 106, while away from the remote desktop 106.

Export commands are generated at 1104. In some examples, the proxy services agent 110 operating on the remote desktop 106 receives service requests for exporting or exporting specific selected screens opened on the remote desktop 106. The proxy services agent 110 performs the requested services, optionally, by performing system calls to the operating system running on remote desktop 106. Alternatively, applications running on the remote desktop 106 may also be queried to perform the services.

A result set that includes the SSE UI window is gathered by the proxy service agent 110 and returned to the client device 104, in some examples as part of the command queue 800 at 1106. The command queue 800 includes, as an example, instructions to export the selected screen and one or more pointers to the images of the opened selected screen.

Polling requests are received from the client device 104, as shown at block 1108. In response to polling from the desktop agent 108 of the client device 104, the remote desktop 106 exposes the commands in the command queue 800. In response to the polling requests, locations of images of the opened program on the remote desktop 106 are provided to the client device 104, as shown at block 1110. The file explorer service agent 112-1 either provides the pointer location to the images of the opened file, allowing the desktop agent 108 of the client device 104 to retrieve the images and display the exported opened selected screen or file on the client device 104, or alternatively, the file explorer service agent 112-1 pulls and provides the images to the desktop agent 108 of the client device 104 as a result set transmitted via the data transmitter 402. The images can then be retrieved by the client device and displayed to export the open program. In some examples, the remote desktop 106 actively broadcasts the generated commands to the client device 104. In this example, the client device 104 need not poll the remote desktop 106 for pending commands.

Figure 7:
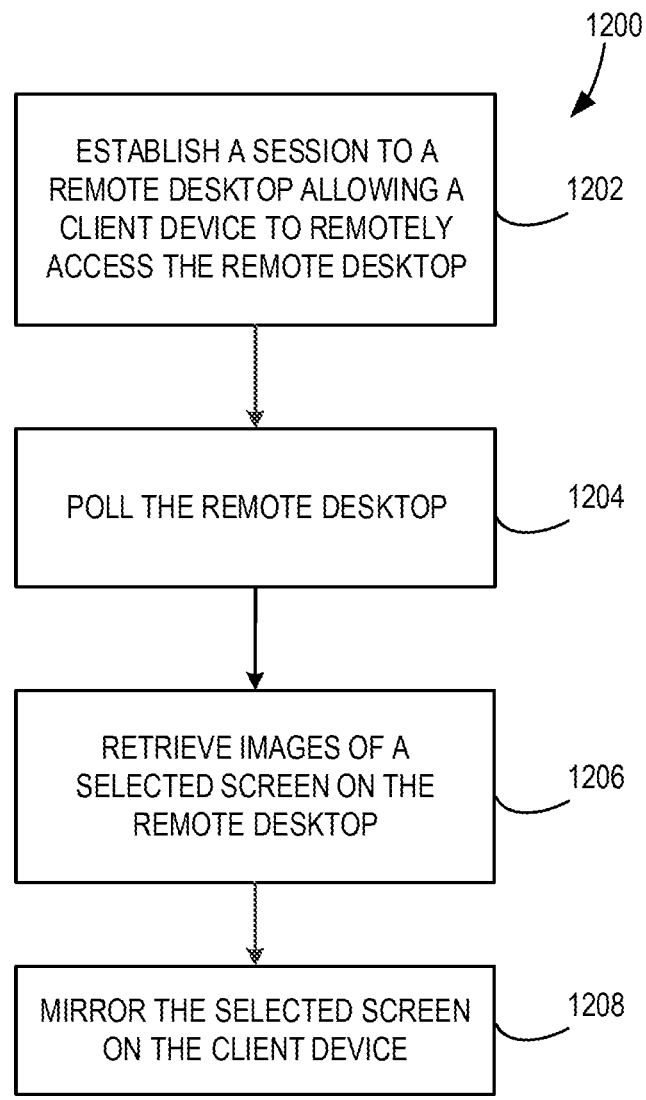
FIG. 7 is a flow chart diagram illustrating a work flow for exporting a selected screen from the perspective of the client device.

FIG. 7 is an example flow chart diagram illustrating a work flow 1200 for exporting an open and user-selected program on a remote desktop. In some examples, the selected screen or program is exported even while the remote desktop 106 is locked, in screen saver mode, or otherwise inaccessible. Initially, a session is established between a remote desktop 106 determined for a user of a client device 104 and a client device 104, as shown at block 1202. The session allows the client device 104 to remotely access the remote desktop 106 to have an selected screen, file, application, program, and the like on the remote desktop 106 exported onto the client device 104. The remote desktop 106 is polled, as indicated at block 1204, to request queued export commands related to the one or more desktop services being opened on the remote desktop 106.

Images of a selected screen on the remote desktop 106 are retrieved, as indicated at block 1206 from the command queue 800. In some examples, the images are stored on, and retrieved from a server. In other examples, images of the exported selected screen are retrieved from the remote desktop 106, in an embodiment, by either the desktop agent 108 or the file explorer service agent 112-1 using a Web Distributed Authoring and Versioning (WebDAV) protocol. In addition to the images retrieved from the command queue 800, the client device 104 also retrieves instructions to export, pointers associated with the exported image, and other instructions. As an example, the instructions from the remote desktop 106 include instructions to poll the remote desktop 106 periodically, at an interval specified by the remote desktop 106. Instructions are transmitted through the command queue 800 in accordance with policies or protocols established by administrators and/or users, and federated to the client devices 104.

The retrieved images are used to export the selected screen, file, program, application, etc. onto the client device 104, as indicated at block 1208. The desktop agent 108 of the client device 104 displays the retrieved images of the exported selected screen and, in an embodiment, continues polling the proxy services agent 110 and retrieving subsequent images of the opened selected screen to continue the exporting process.

Desktop agent 108 uses a native renderer 116 to display the result set. Desktop agent 108 and native renderer 116 are, in some embodiments, integrated into a single application that is installed onto the client device 104. Native renderer 116 selects a native viewer and launches the native viewer to display the result set. The native viewer may be a component of the system software shipped with the client device 104, an add-on application or plug-in, or integrated with desktop agent 108 and/or native renderer 116. In some examples, the size and shape of the images displayed by the client device 104 are altered or updated to conform to the shape and size of the client device 104. The native renderer 116 updates, edits, adapts, etc. the images retrieved by the client device 104 for display upon the client device 104 in the appropriate format specific to the client device 104.

The client device 104, in some embodiments, downloads, retrieves, or otherwise receives from the remote desktop 106 a desktop service such as a file, document, program, etc. for consumption at the client device 104. In that case, instead of maintaining communication between the client device 104 and the remote desktop 106, the exporting session is terminated after an accurate and complete copy of the appropriate desktop service is established on the client device 104. The exported desktop service is consumed, edited, or otherwise used on the client device 104, without regard to continued exporting in either direction.

Figure 8:
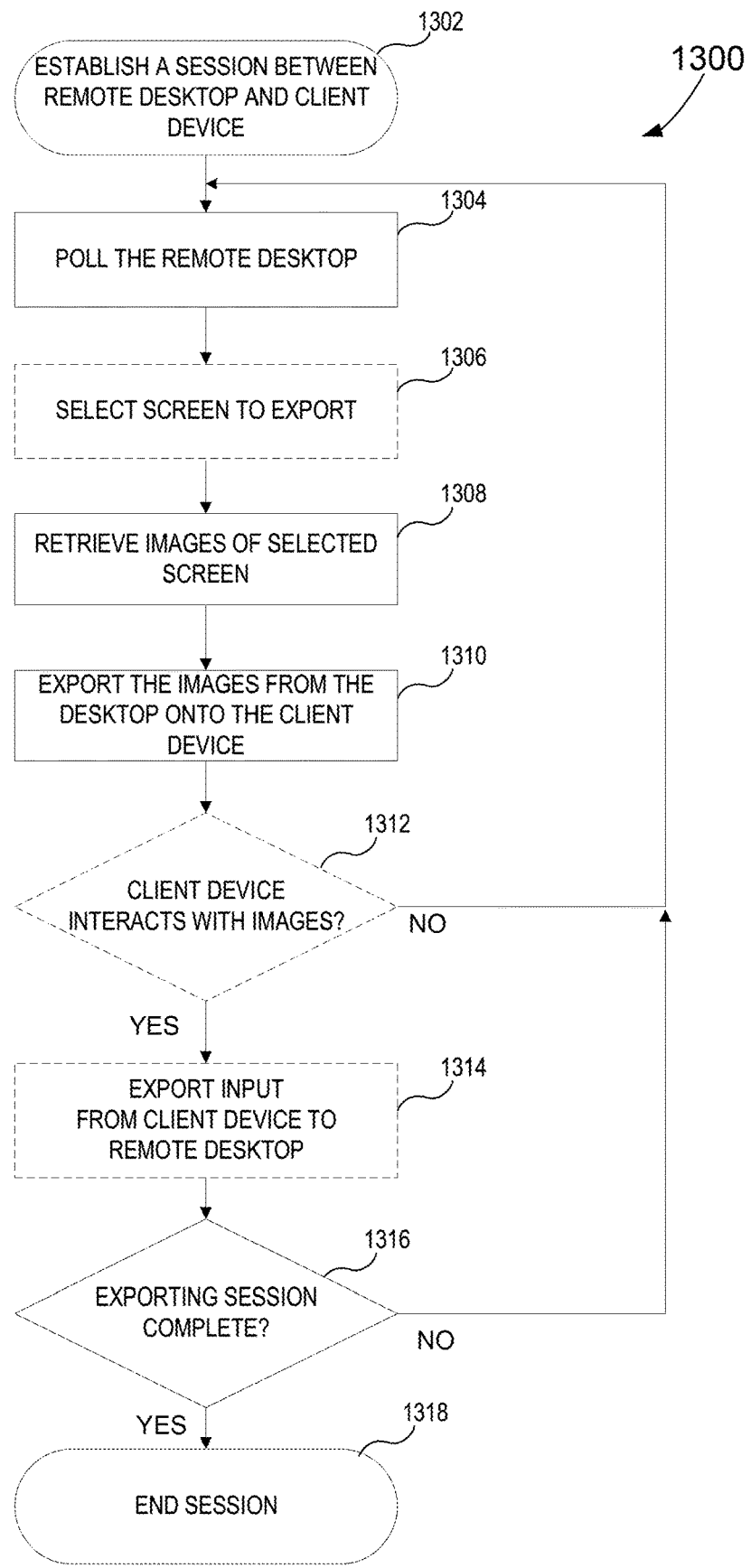
FIG. 8 is a flow chart diagram illustrating a work flow for bi-directional exporting of a selected screen.

FIG. 8 is a flow chart diagram illustrating a work flow for bi-directional exporting of a selected screen. In the example of FIG. 8, a session is established between the remote desktop 106 and the client device 104 at 1302. At 1304, the client device 104 polls the remote desktop 106. An initial poll of the remote desktop 106 reveals, in some examples, documents, applications, programs, etc. available for exporting. In those examples, the client device 104 indicates to the remote desktop which item is selected for exporting at 1306. Alternatively, a command generated at the remote desktop 106 identifies which item is exported.

At 1308 the images identified for exporting are retrieved from the remote desktop 106. In some examples, as discussed above, the images and pointers are placed in the command queue 800 by the remote desktop 106 for retrieval by the client device 104, as disclosed in FIG. 8. At 1310 the client device 104 exports the images, as disclosed in FIG. 5. At 1312, in some embodiments, a user interacts with the image on the client device 104. This embodiment permits limited exporting both ways between the client device 104 and the remote desktop 106, such that commands made to the opened selected screen on the client device 104 are stored and reflected in the selected screen on the remote desktop 106. In such an embodiment, the file explorer agent 112-1 is bi-directional, meaning that it can both retrieve images of the opened selected screen from the remote desktop 106, and receive and store limited commands relating to the opened selected screen from the client device 104. As an example, commands to "Cancel," "Accept," or "Run" an operation relating to the opened selected screen are received, stored, and ultimately communicated to the remote desktop 106. In the interactive move, the SSE agent 812-3 is bi-directional, meaning it is capable of receiving user interactions in the exported UI window from the client device 104 and providing such interactions to the corresponding program of the UI running on the remote desktop 106.

In some embodiments the system provides only read-only exports to the client device 104. Alternatively, in the bi-directional embodiment, the desktop agent 108 exports the commands made by the user back to the remote desktop 106 at 1314 making the exported screens interactive in some embodiments. The desktop agent tracks and marks exported selected screens according to user edits, inputs, stylus touches on a touch screen of the client device 104, and the like. For example, a status bar may be exported on the client device 104, and a user may interact with the status bar using the pop-up keyboard on a client device 104 screen. As an example, the user indicates that he accepts a license agreement on the status bar, allowing installation to continue. The client device 104 may be configured to automatically—or upon user command—transmit the user input to the remote desktop 106. Commands generated by the client device 104 in the bi-directional embodiment are executed by the remote desktop 106.

At 1316, if the exporting session is terminated at either the client device 104 or the remote desktop 106, then the session is ended at 1318. Otherwise, the client device 104 continues to poll the command queue 800 for additional exporting commands. In some embodiments, the client device 104 also continues to return commands to the remote desktop 106, if bi-directional exporting is used.

In some examples, a helper application operates on the client device 104. The helper application permits the client device 104 to receive from the remote desktop 106 one or more elements of a workflow task initiated on the remote desktop 106. The helper application executes the elements, and returns the result to the remote desktop 106. In this manner, the remote desktop 106 leverages computation resources of the client device 104. As an example, a client device 104 with available computational resources receives one or more elements of a workflow relating to computations performed on the remote desktop 106. The helper application manages the execution of the operations necessary to complete the computations, and returns the result to the remote desktop 106.

In examples of bi-directional exporting, priority is established as to which commands are executed first, those originating at the client device 104 or those originating with the remote desktop 106. In some examples, commands from the remote desktop 106 are given priority. Alternatively, the commands originating at the client device 104 are prioritized. In either example, a user/administrator establishes the priority, and federates it in some examples by way of a policy, procedure, protocol, and the like.

In examples where the monitoring tool is exported to the client device 104, the client device detects changes to the monitoring tool. Alternatively, the remote desktop 106 detects changes to the monitoring tool (e.g., notifications that an installation has completed, prompts to the user, aborted attempts, etc.). The changes detected are presented to the user on the client device 104. The monitoring tool is any number of tools used to follow progress of a workflow or other operations on the remote desktop 106. As an example, the monitoring tool includes a progress bar, a status window, or a dialogue box.

Figure 9:
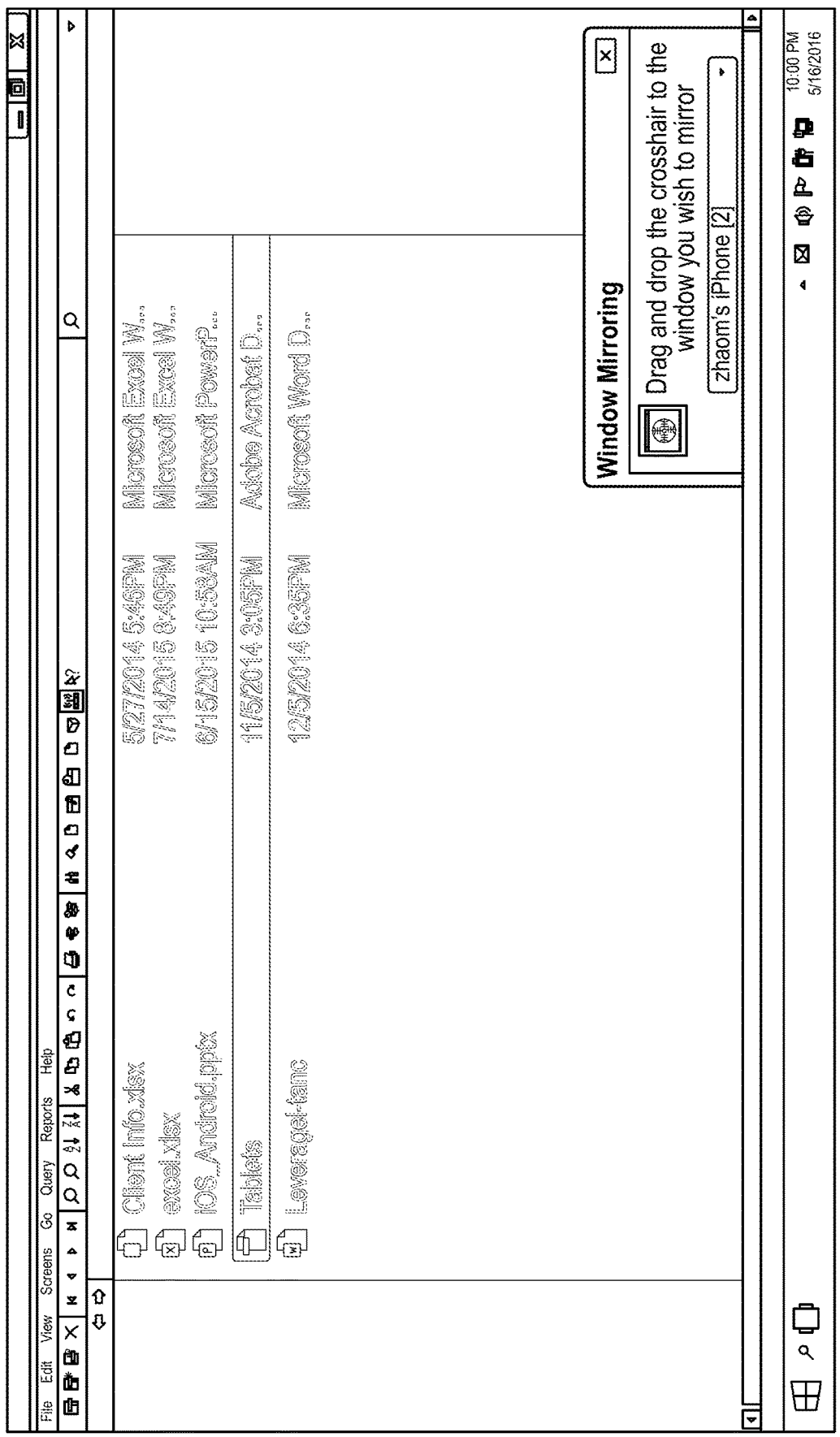
FIGS. 9 and 10 illustrate various UIs of select screen exporting techniques.
Figure 10:
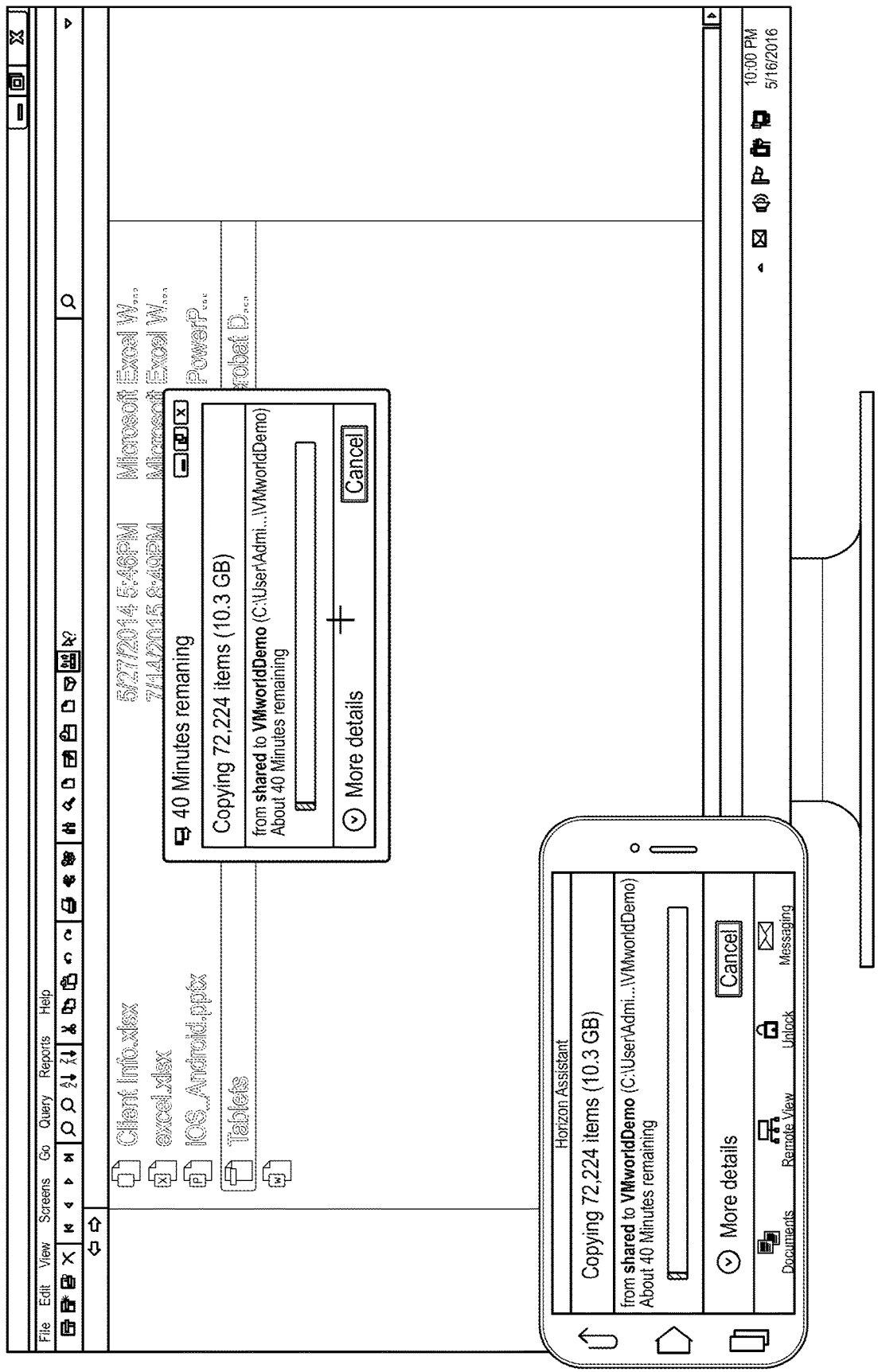

FIGS. 9 and 10 illustrate various UIs of the SSE mirroring techniques disclosed herein, according to one or more embodiments. Looking at FIG. 9, a UI screen on the remote desktop 106 is shown providing options for a user to select a screen for SSE mirroring. The SSE agent 812-3 of the remote desktop 106 prompts the user to drag and drop a crosshair pointer to select a window the user wishes to mirror.

FIG. 10 illustrates the crosshair pointer being used to select a copy progress bar for SSE mirroring to the client device 104, and shows the selected copy progress bar being mirrored on a client device 104.

Figure 11:
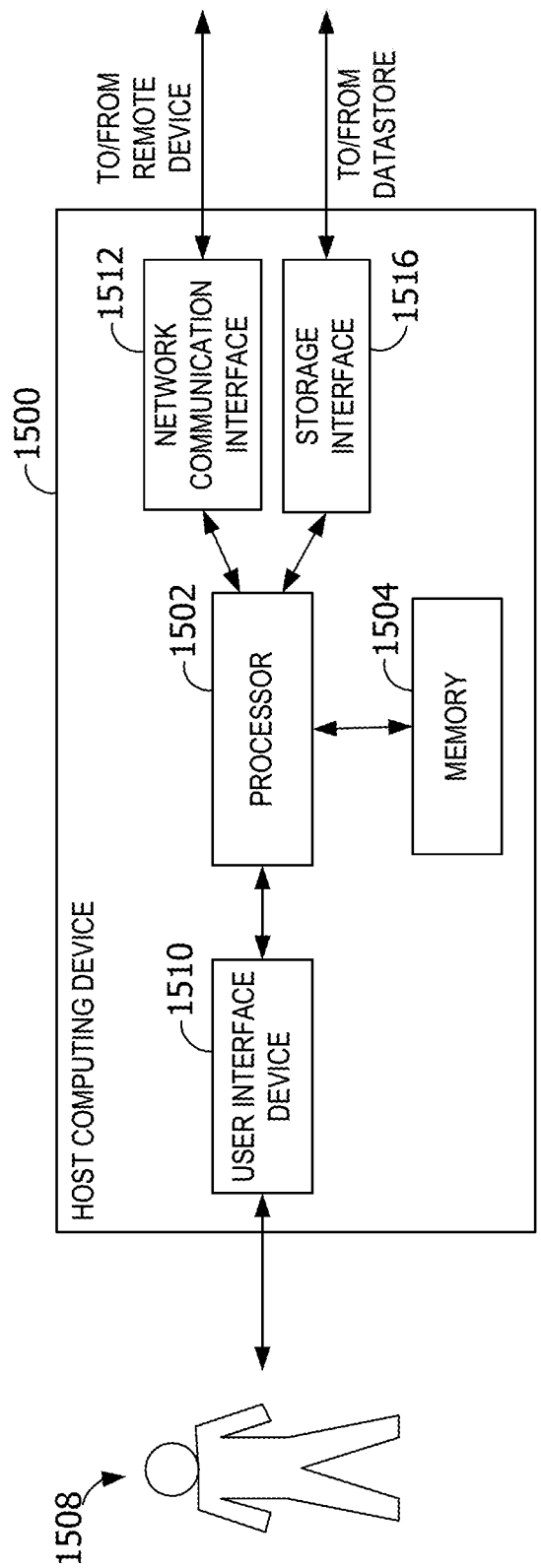
FIG. 11 is an example block diagram of a host computing device.

FIG. 11 is a block diagram of an example host computing device 1500. Host computing device 1500 includes a processor 1502 for executing instructions. In some examples, executable instructions are stored in a memory 1504. Memory 1504 is any device allowing information, such as executable instructions and/or other data, to be stored and retrieved. For example, memory 1504 may include one or more random access memory (RAM) modules, flash memory modules, hard disks, solid state disks, and/or optical disks.

Host computing device 1500 may include a user interface device 1510 for receiving data from a user 1508 and/or for presenting data to user 1508. User 1508 may interact indirectly with host computing device 1500 via another computing device such as a device running VMware's vCenter Server or other management device. User interface device 1510 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 1510 operates to receive data from user 1508, while another device (e.g., a presentation device) operates to present data to user 1508. In other examples, user interface device 1510 has a single component, such as a touch screen, that functions to both output data to user 1508 and receive data from user 1508. In such examples, user interface device 1510 operates as a presentation device for presenting information to user 1508. In such examples, user interface device 1510 represents any component capable of conveying information to user 1508. For example, user interface device 1510 may include, without limitation, a display device (e.g., a liquid crystal display (LCD), organic light emitting diode (OLED) display, or "electronic ink" display) and/or an audio output device (e.g., a speaker or headphones). In some examples, user interface device 1510 includes an output adapter, such as a video adapter and/or an audio adapter. An output adapter is operatively coupled to processor 1502 and configured to be operatively coupled to an output device, such as a display device or an audio output device.

Host computing device 1500 also includes a network communication interface 1512, which enables host computing device 1500 to communicate with a remote device (e.g., another computing device) via a communication medium, such as a wired or wireless packet network. For example, host computing device 1500 may transmit and/or receive data via network communication interface 1512. User interface device 1510 and/or network communication interface 1512 may be referred to collectively as an input interface and may be configured to receive information from user 1508.

Host computing device 1500 further includes a storage interface 1516 that enables host computing device 1500 to communicate with one or more data storage devices, which store virtual disk images, software applications, and/or any other data suitable for use with the methods described herein. In example examples, storage interface 1516 couples host computing device 1500 to a storage area network (SAN) (e.g., a Fibre Channel network) and/or to a network-attached storage (NAS) system (e.g., via a packet network). The storage interface 1516 may be integrated with network communication interface 1512.

Figure 12:
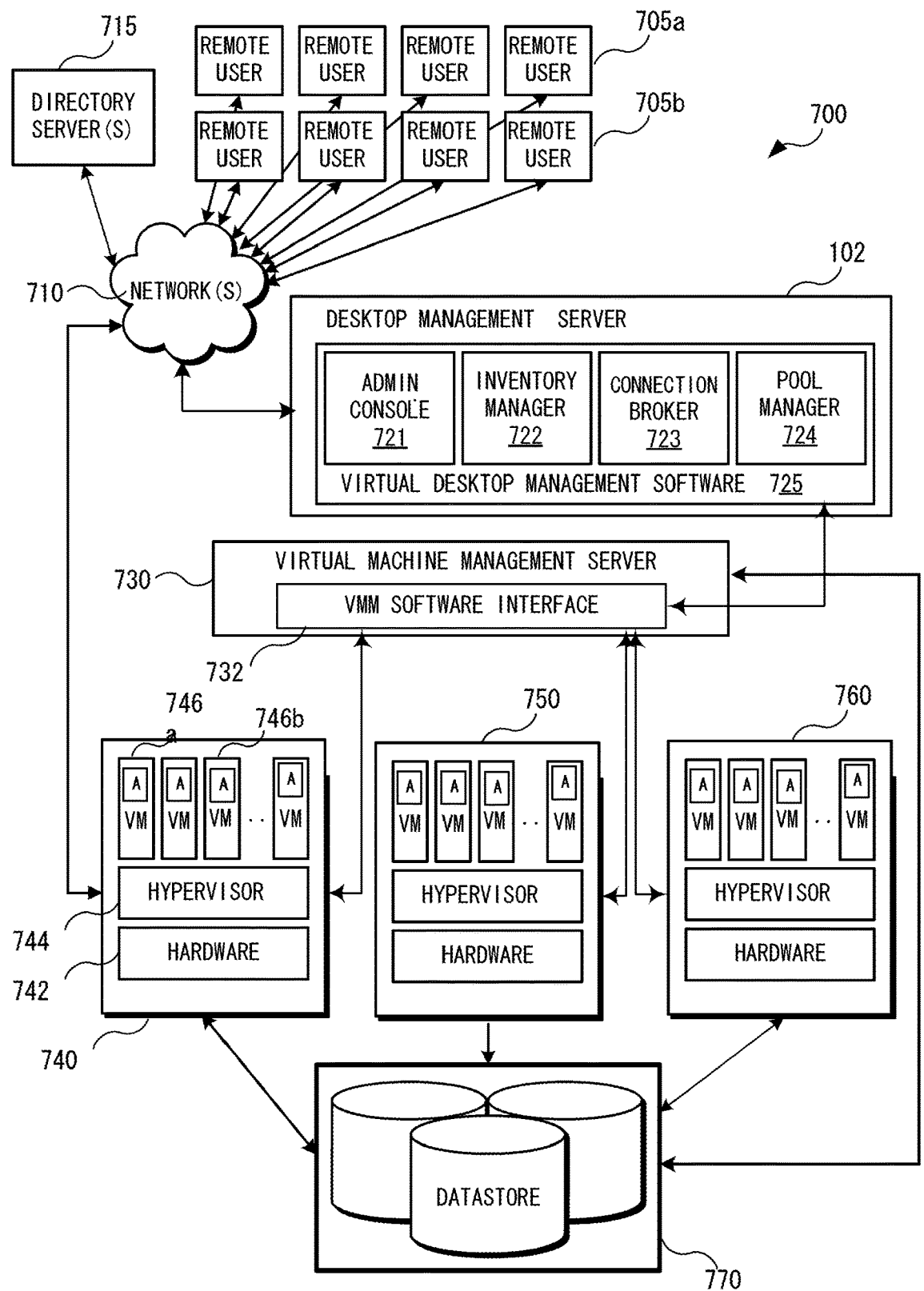
FIG. 12 illustrates a block diagram of an example general virtualized machine architecture environment.

FIG. 12 is a block diagram of an example general virtual desktop infrastructure (VDI) environment for executing example embodiments. The following architecture may be used in a remote desktop session and may be enhanced to use the client services interface to have services performed and return result sets for display using native viewers 206. As shown in FIG. 7, in traditional use, remote users, for example users 705*a* and 705*b*, may access centrally-managed remote desktops 106, such as those implemented by virtual machines 746 running in a datacenter, using network 710 (e.g., a local area network, or other private or publically accessible wide area network, such as the Internet) through any number of different types of devices. These virtual machines (VMs) 746 are complete computation environments, containing virtual equivalents of the hardware and system software components of a physical system as described above, and are typically implemented by an extensive virtualization infrastructure, which includes a variety of software and hardware components.

Remote access to remote desktops is generally provided to client devices through a desktop management server 102. Desktop management server 102 provides access to remote desktops by the remote user devices, and manages the corresponding virtual machines through communications with a software interface 732 of a Virtual Machine Management Server (VMMS) 730. The Virtual Machine Management Server (VMMS) 730 is responsible for provisioning and maintaining the multitude of Virtual Machines (VMs) 746 implemented across potentially a multitude of physical computers, such as computers 740, 750, and 760. When a user wishes to access an existing virtual machine, the user establishes a connection through the desktop management server 102, and a remote desktop is presented (as a user interface) on the user's client device, through which communications are made with the underlying virtual machine. Additionally, the virtual machine may include a proxy services agent 110 as described above with reference to FIG. 1 to perform service requests.

In the example embodiment shown, each physical computer, for example computer 740 contains the underlying hardware 742, virtualization software (here a hypervisor 744), and one or more virtual machines, for example VM 746*a* and VM 746*b*, which each contain Agent Software (guest system software) labeled here as "A" in each VM box. The Agent Software is typically responsible for connecting each VM to the desktop management server 102 and manages each desktop connection. It typically notifies the desktop management server 102 upon each login, logoff, and disconnect. The Agent Software also provides support for remote devices such as USB devices, etc. The Agent Software may also be enhanced to include proxy services agent 110 and service plug-ins 112.

The VMMS 730 typically manages pools of compute resources used to run virtual machines on a set of clusters typically containing multiple servers with CPUs, memory, and communications hardware (network). A virtual computer (a virtual machine or VM), when active, consumes physical compute resources and is managed by a hypervisor layer, such as hypervisor 744 running on physical computer 740. The hypervisor manages physical resources as well as maintains virtual-to-physical hardware mappings. The Software Interface 732 running on the VMMS 730 communicates with these hypervisors (e.g., hypervisor 744) to provision and manage each VM 746. For example, according to traditional virtualization techniques, when a remote user (e.g., user 705*a*) requests access to a particular existing desktop, the desktop management server 102 (through its software 725), communicates with the VMMS through its software interface 732 to start the corresponding VM 746 executing on an appropriate physical computer, and to relay the user interface exported by the VM 746 to the remote user so that the user can interact with the remote desktop. In some instances (e.g., according to administrator policies), when the desktop is exited, or otherwise shutdown, the desktop management server 102 communicates with the VMMS 730 to save the VM image to the datastore 770 as appropriate and to de-allocate physical and VM system resources as needed.

In general, the VMMS Server 730 provides interfaces 732 to enable other programs, such as the Pool Manager 724, to control the lifecycle of the various virtual machines that run on a hypervisor. In one example embodiment of an existing virtualization infrastructure provided by VMware Inc., desktop management server 102 includes an Administrative Console 721, an Inventory Manager 722, a Connection Broker 723, and a Pool Manager 724. The Connection Broker 723 allows a remote user, such as remote user 705*a*, through client device 104, to initiate a desktop session with an assigned VM 746 or to access an existing connection to VM 746. Connection Broker 723 may also be enhanced to include remote desktop gateway 302.

The Inventory Manager 722 maintains a mapping of different user belongings in the system. For example, user may be entitled to certain applications; may have access to more than one desktop, etc. The Inventory Manager 722 also keeps track of the running remote desktops in the system. The mappings may be stored using any number of mechanisms, including using one or more directory servers 715 accessible through network 710.

The Pool Manager 724 component manages the complete lifecycle of remote desktops. Desktops in a pool are grouped together based on similar software requirements. Desktop Administrators create logical desktops groups (desktop pools) that are provisioned typically from the same base image, including the Agent Software. For example, a desktop pool may include virtual machines that run the same set of software applications and run the same OS. As yet another example, a desktop pool may contain a set of cloned virtual machines that are identical in every aspect but are customized to include unique identity that includes for example, a unique computer name, IP/MAC Address, Domain membership, Software license serial numbers, OS specific security identifiers among other things. The base image can be a virtual machine or a template virtual machine that is created and/or managed by the VMMS 730.

The software state of all the virtual machines 746 in a desktop pool may be persistent or non-persistent. Persistent desktops maintain the state of the files or applications stored inside the virtual machines. Non-Persistent desktops are stateless desktops; the desktop state is restored to the original state after every user session. In some cases, the Desktop Administrator can define how frequently the "revert to golden state" operation should be performed. The restore to pristine image or revert to golden state operation can also be scheduled to occur based on certain conditions.

The Administrative Console 721 typically provides a user interface for a Desktop Administrator to manage the configuration of desktop pools, define user access policies, manage ongoing maintenance, software installed in the desktops, etc.

The Directory Server 715 stores the persistent state required for managing the remote desktops. For example, the VMs in a desktop pool may be associated with one or more users. The user identifiers for a pool may be stored in the directory server 715. The users may also be referenced through an external directory server.

The illustrated virtualization architecture is shown using a hypervisor-centric model. Alternative embodiments may control some or all of the VMs 746 in a virtualization architecture that uses containers instead of hypervisors. Yet, other embodiments may manage the depicted VM environment with unikernels. Thus, the illustrated virtualization architecture is but only one configuration for implementing the various embodiments disclosed herein.

Embodiments are not limited to being executed in virtualized environments, however. The disclosed embodiments may be run simply between desktop, server, and client mobile devices in a public or private network environment.

Virtual machines may be instantiated on host computing device. Host computing device includes a hardware platform, such as an x86 architecture platform. Hardware platform may include processor, memory, network communication interface, user interface device, and other input/output (I/O) devices, such as a presentation device. A virtualization software layer, also referred to hereinafter as a hypervisor, is installed on top of hardware platform.

The virtualization software layer supports a virtual machine execution space within which multiple virtual machines (VMs) may be concurrently instantiated and executed. Hypervisor includes a device driver layer, and maps physical resources of hardware platform (e.g., processor, memory, network communication interface, and/or user interface device) to "virtual" resources of each of VMs such that each of VMs has its own virtual hardware platform (e.g., a corresponding one of virtual hardware platforms), each virtual hardware platform having its own emulated hardware (such as a processor, a memory, a network communication interface, a user interface device and other emulated I/O devices in VM). Hypervisor may manage (e.g., monitor, initiate, and/or terminate) execution of VMs according to policies associated with hypervisor, such as a policy specifying that VMs are to be automatically restarted upon unexpected termination and/or upon initialization of hypervisor. In addition, or alternatively, hypervisor may manage execution VMs based on requests received from a device other than host computing device. For example, hypervisor may receive an execution instruction specifying the initiation of execution of first VM from a management device via network communication interface and execute the execution instruction to initiate execution of first VM.

In some examples, memory in first virtual hardware platform includes a virtual disk that is associated with or mapped to one or more virtual disk images stored on a disk (e.g., a hard disk or solid state disk) of host computing device. The virtual disk image represents a file system (e.g., a hierarchy of directories and files) used by first VM in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer includes, for example, a communication interface driver 1020 that interacts with network communication interface to receive and transmit data from, for example, a local area network (LAN) connected to host computing device. Communication interface driver also includes a virtual bridge that simulates the broadcasting of data packets in a physical network received from one communication interface (e.g., network communication interface) to other communication interfaces (e.g., the virtual communication interfaces of VMs). Each virtual communication interface for each VM, such as network communication interface for first VM, may be assigned a unique virtual Media Access Control (MAC) address that enables virtual bridge to simulate the forwarding of incoming data packets from network communication interface. In an example, network communication interface is an Ethernet adapter that is configured in promiscuous mode such that all Ethernet packets that it receives (rather than just Ethernet packets addressed to its own physical MAC address) are passed to virtual bridge, which, in turn, is able to further forward the Ethernet packets to VMs. This configuration enables an Ethernet packet that has a virtual MAC address as its destination address to properly reach the VM in host computing device with a virtual communication interface that corresponds to such virtual MAC address.

Virtual hardware platform may function as an equivalent of a standard x86 hardware architecture such that any x86-compatible desktop operating system (e.g., Microsoft WINDOWS brand operating system, LINUX® brand operating system, SOLARIS® brand operating system, NETWARE®, or FREEBSD®) may be installed as guest operating system (OS) in order to execute applications 1070 for an instantiated VM, such as first VM. Virtual hardware platforms may be considered to be part of virtual machine monitors (VMM) that implement virtual system support to coordinate operations between hypervisor and corresponding VMs. Those with ordinary skill in the art will recognize that the various terms, layers, and categorizations used to describe the virtualization components may be referred to differently without departing from their functionality or the spirit or scope of the disclosure. For example, virtual hardware platforms may also be considered to be separate from VMMs, and VMMs may be considered to be separate from hypervisor. One example of hypervisor that may be used in an example of the disclosure is included as a component in VMWARE ESX® brand software.

Additional Embodiments

In some embodiments, a system includes a desktop agent that cooperates with a mobile agent to provide a range of augmented services to desktop users, allowing the mobile device to function as an extension of the desktop for designated tasks. Alternatively or in addition, the multiple helper devices are registered simultaneously to the desktop for purposes of serving as augmentations to user productivity or enhancements to user experience. Alternatively or in addition to any of the preceding embodiments, a user can authenticate to a remote desktop session using the touch-ID capability of a mobile device such as an Apple iPad or iPhone, or wearable watch. In some embodiments, a user may lock or unlock the desktop's screen using Touch-ID.

Alternatively or in addition to any of the preceding embodiments, application windows launched on the desktop are automatically mirrored to a mobile device for viewing on that device. Alternatively or in addition to any of the preceding embodiments, application windows can be directly launched on a mobile device from the desktop using the format 'Open Document on Device' where 'Device' is the name of a target mobile device.

Alternatively or in addition to any of the preceding embodiments, specific application window types are designated for automatic mirroring on specific target device allowing direct routing of application windows launched on the desktop to target devices based on application window type.

Alternatively or in addition to any of the preceding embodiments, an application window launched on the desktop may be mirrored directly to multiple devices simultaneously.

Alternatively or in addition to any of the preceding embodiments, a mirrored document may be signed using a finger or stylus on the touch screen device for a resulting PDF containing the resulting document with applied signature. In some embodiments, the signed document is saved back directly to a designated folder in the desktop's file system with the original file name plus an appended suffix such as "_signed."

Alternatively or in addition to any of the preceding embodiments, the signed document is sent to a desktop email program for attachment into an email.

Alternatively or in addition to any of the preceding embodiments, the signed document may be generated from a designated email template such as a Microsoft Outlook Template which results in a preformatted email with the signed document attached.

Alternatively or in addition to any of the preceding embodiments, a designated application window is mirrored to a mobile device such that a selected area of the desktop is visible on a designated mobile device for the purposes of viewing a discreet portion of the source desktop.

Alternatively or in addition to any of the preceding embodiments, the selected screen portion is exported to the mobile device and remains visible when the source desktop is locked for security reasons or in screen-saver mode.

Alternatively or in addition to any of the preceding embodiments, the selected screen portion is mirrored to multiple devices simultaneously.

Alternatively or in addition to any of the preceding embodiments, a timestamp is applied to the exported window visible on the mobile device upon the closure of the source window exported from the desktop.

Alternatively or in addition to any of the preceding embodiments, the selected portion of the source desktop is exported to a wearable device such as a digital watch.

An embodiment is directed to a method comprising a helper application running on a remote device connecting to a remote desktop for the purpose of enhancing the desktop user's productivity by augmentation of workflow elements for tasks initiated on the desktop, continued on the mobile device, and completed on the desktop.

Alternatively or in addition to any of the preceding embodiments, document signing is initiated on the desktop by launching a document, continued on a mobile device by signing on a touch screen, and completed on the desktop by saving the signed document or emailing same.

Alternatively or in addition to any of the preceding embodiments, a portion of the desktop screen is exported to a mobile device for discreet viewing, when the desktop screen is locked or unlocked.

Alternatively or in addition to any of the preceding embodiments, a non-desktop device such as a touch-ID fingerprint device is used to authenticate and unlock the desktop operating system.

Alternatively or in addition to any of the preceding embodiments, application windows are mirrored to the mobile device(s) for consumption decoupled from the source desktop.

While file viewing has been described, file editing is also possible where the changes may be pushed back to remote desktop 106. In this case, changes may be sent back to remote desktop 106. The edits may be stored in the files at remote desktop 106. Different techniques may be used to store the changes, such as a binary "diff" of files to push back only changes in a file.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the operations. The various embodiments described herein may also be practiced with other computer system configurations including hand-held devices, microprocessor systems, microprocessor-based or programmable consumer electronics, minicomputers, mainframe computers, and the like.

The examples illustrated and described herein as well as examples not specifically described herein but within the scope of aspects of the disclosure constitute exemplary means for remote desktop mirroring. For example, the elements illustrated in the figures, such as when encoded to perform the operations illustrated in the figures, constitute exemplary means for implementing the operations recited in the Claims and/or otherwise described herein.

One or more embodiments may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CDR, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or the like. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or the like in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when programmed to execute the instructions described herein.

At least a portion of the functionality of the various elements illustrated in the figures may be performed by other elements in the figures, or an entity (e.g., processor, web service, server, application program, computing device, etc.) not shown in the figures.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

These and other variations, modifications, additions, and improvements may fall within the scope of the appended claims(s). As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

We claim:

1. A computer-implemented method performed by at least a processor, the method comprising:
   receiving, by a destination device, a selected portion of a graphical user interface (GUI) window open on a source device to be mirrored to the destination device;
   polling the source device for information generated on the source device, the information comprising image location information related to the selected portion of the GUI window, the selected portion of the GUI window on the source device including one or more control elements requiring one or more responses;
   based on the polling of the source device, accessing the image location information related to the selected portion of the GUI window on the source device;
   based on accessing the image location information, obtaining, by the destination device, an image of the selected portion of the GUI window from a location specified by the image location information, the image including the one or more control elements requiring one or more responses;
   displaying, by the destination device, the image of the selected portion of the GUI window;
   upon receiving a response to a first control element of the one or more control elements of the image on the source device and receiving a response to the first control element of the image on the destination device, before performing at least one action corresponding to either of the received responses, prioritizing the response received on the destination device to be selected over the response received on the source device; and
   performing the at least one action corresponding to the selected response on the destination device, and communicating the at least one performed action to the source device.

2. The method of claim 1, wherein the selected portion of the GUI window includes a progress status bar that is associated with a compile job of a program, the progress status bar indicating a compile time of the program on the destination device.

3. The method of claim 2, wherein the progress status bar displays sequential images of progress of the compile job on a wearable device.

4. The method of claim 1, wherein a priority to select the response received on the destination device and the response received on the source device is established by a user of the source device.

5. The method of claim 1, wherein receiving the selected portion of the GUI window further comprises:
   receiving from the source device, indication of one or more changes in the selected portion of the GUI window requiring a response; and
   providing at the destination device the response, the response being communicated back to the source device for action.

6. The method of claim 1, wherein the selected portion of the GUI window includes a progress status bar and further comprising:
   displaying the progress status bar in an interactive mode that includes one or more control elements prompting one or more responses at the destination device; and
   providing a response on the destination device to the one or more control elements by selecting one option of one or more options shown in a dialogue box on the destination device.

7. The method of claim 1, further comprises:
   initiating a connection to a virtual machine by providing registration credentials of the destination device to the virtual machine; and
   based on the provided registration credentials, providing access to the source device via the virtual machine.

8. The method of claim 1, further comprising:
   automatically receiving from the source device one or more first files open on the source device, the source device being configured to export the one or more first files whenever the one or more first files are opened on the source device.

9. A system, comprising:
   one or more memories storing computer-executable instructions; and
   one or more processors operationally coupled to the one or more memories and configured to execute the computer-executable instructions to:
      receive, by a destination device, a selected portion of a graphical user interface (GUI) window open on a source device to be mirrored to the destination device;
      poll the source device for information generated on the source device, the information comprising image location information related to the selected portion of the GUI window, the selected portion of the GUI window on the source device including one or more control elements requiring one or more responses;
      based on the polling of the source device, access the image location information related to the selected portion of the GUI window on the source device;
      based on accessing the image location information, obtain, by the destination device, an image of the selected portion of the GUI window from a location specified by the image location information, the image including the one or more control elements requiring one or more responses;
      displaying, by the destination device, the image of the selected portion of the GUI window;
      upon receiving a response to a first control element of the one or more control elements of the image on the source device and receiving a response to the first control element of the image on the destination device, before performing at least one action corresponding to either of the received responses, prioritizing the response received on the destination device to be selected over the response received on the source device; and
      performing the at least one action corresponding to the selected response on the destination device, and communicating the at least one performed action to the source device.

10. The system of claim 9, wherein the selected portion of the GUI window includes a progress status bar that is associated with a compile job of a program, the progress status bar indicating a compile time of the program on the destination device.

11. The system of claim 10, wherein the progress status bar displays sequential images of progress of the compile job on a wearable device.

12. The method of claim 9, wherein a priority to select the response received on the destination device and the response received on the source device is established by a user of the source device.

13. The system of claim 9, wherein receiving the selected portion of the GUI window further comprises:
   receiving from the source device, indication of one or more changes in the selected portion of the GUI window requiring a response; and
   providing at the destination device the response, the response being communicated to the source device for action.

14. The system of claim 9, wherein the one or more processors operationally coupled to the one or more memories are configured to execute the computer-executable instructions to further:
   initiate a connection to a virtual machine by providing registration credentials of the destination device to the virtual machine; and
   based on the provided registration credentials, provide access to the source device via the virtual machine.

15. The system of claim 9, wherein the one or more processors operationally coupled to the one or more memories are configured to execute the computer-executable instructions to further:
   automatically receive from the source device one or more first files open on the source device, the source device being configured to export the one or more first files whenever the one or more first files are opened on the source device.

16. The system of claim 9, wherein the selected portion of the GUI window includes a progress status bar and the one or more processors operationally coupled to the one or more memories are configured to execute the computer-executable instructions to further:
   display the progress status bar in an interactive mode that includes one or more control elements prompting one or more responses at the destination device; and
   provide a response on the destination device to the one or more control elements by selecting one option of one or more options shown in a dialogue box on the destination device.

17. A non-transitory computer-storage memory embodied with instructions executable by one or more processors to enable remote authentication of a desktop by a client device, said instructions comprising:
   receiving, by a destination device, a selected portion of a graphical user interface (GUI) window open on a source device to be mirrored to the destination device;
   polling the source device for information generated on the source device, the information comprising image location information related to the selected portion of the GUI window, the selected portion of the GUI window on the source device including one or more control elements requiring one or more responses;
   based on the polling of the source device, accessing the image location information related to the selected portion of the GUI window on the source device;
   based on accessing the image location information, obtaining, by the destination device, an image of the selected portion of the GUI window from a location specified by the image location information, the image including the one or more control elements requiring one or more responses;

displaying, by the destination device, the image of the selected portion of the GUI window;

upon receiving a response to a first control element of the one or more control elements of the image on the source device and receiving a response to the first control element of the image on the destination device, before performing at least one action corresponding to either of the received responses, prioritizing the response received on the destination device to be selected over the response received on the source device; and performing the at least one action corresponding to the selected response on the destination device, and communicating the at least one performed action to the source device.

18. The non-transitory computer-storage memory of claim 17, wherein the selected portion of the GUI window includes a progress status bar, the progress status bar being associated with a compile job of a program, and indicating a compile time of the program on the destination device.

19. The non-transitory computer-storage memory of claim 18, wherein the progress status bar displays sequential images of progress of the compile job on a wearable device.

20. The non-transitory computer-storage memory of claim 17, wherein a priority to select the response received on the destination device and the response received on the source device is established by a user of the source device.

* * * * *